(12) United States Patent
Furukawa et al.

(10) Patent No.: US 7,003,541 B2
(45) Date of Patent: Feb. 21, 2006

(54) ZERO-KNOWLEDGE PROVING SYSTEM AND METHOD

(75) Inventors: Jun Furukawa, Tokyo (JP); Kazue Sako, Tokyo (JP); Satoshi Obana, Tokyo (JP)

(73) Assignee: NEC Corporation, Tokyo (JP)

(*) Notice: Subject to any disclaimer, the term of this patent is extended or adjusted under 35 U.S.C. 154(b) by 668 days.

(21) Appl. No.: 10/212,172

(22) Filed: Aug. 6, 2002

(65) Prior Publication Data

US 2003/0065692 A1  Apr. 3, 2003

(30) Foreign Application Priority Data

Aug. 7, 2001  (JP) .............................. 2001-239615

(51) Int. Cl.
*G06F 17/10* (2006.01)
(52) U.S. Cl. ........................................ 708/512; 380/28
(58) Field of Classification Search ................ 708/512, 708/277; 380/28
See application file for complete search history.

(56) References Cited

U.S. PATENT DOCUMENTS

| | | | | |
|---|---|---|---|---|
| 6,154,841 | A | * | 11/2000 | Oishi ........................ 713/180 |
| 6,282,295 | B1 | * | 8/2001 | Young et al. ............... 380/286 |
| 6,411,715 | B1 | * | 6/2002 | Liskov et al. ............... 380/277 |
| 6,651,167 | B1 | * | 11/2003 | Terao et al. ................ 713/168 |
| 2001/0024501 | A1 | * | 9/2001 | Furukawa ................... 380/28 |

FOREIGN PATENT DOCUMENTS

| | | |
|---|---|---|
| WO | WO 00/48359 | 8/2000 |
| WO | WO 01/20562 A2 | 3/2001 |

OTHER PUBLICATIONS

European Search Report dated Mar. 25, 2004.

Markus Michels, et al., "Efficient Convertible Undeniable Signature Schemes", International Workshop on Selected Areas in Cryptography, Aug. 31, 1997, pp. 231-244, XP002268141.

Hyung-Kyu Yang et al., "Self-Certified Identity Information using the minimum knowledge", 1996 IEEE Tencon, Digital Signal Processing Applications, Nov. 26, 1996, pp. 641-647, XP010236752.

"Zero-knowledge Undeniable Signatures", David Chaum, Advances in Cryptology, Proceedings of Eurocrypt' 1990, LNCS473, Springer-Verlag, pp. 458-464, 1991.

"Efficient Convertible Undeniable Signature Schemes", Proceeding of 4th Annual Workshop on Selected Areas in Cryptography, SAC'97, Aug. 1997.

* cited by examiner

*Primary Examiner*—D. H. Malzahn
(74) *Attorney, Agent, or Firm*—McGinn IP Law Group, PLLC

(57) ABSTRACT

A zero-knowledge proving system includes a proving mechanism for proving equality or inequality of two discrete logarithms and a verifying mechanism for verifying said equality or inequality. The proving mechanism stores public information including a designated operation scheme, two input numbers $\alpha$ and $\beta$, and two predetermined bases g and h, private information x which is a discrete logarithm of $\alpha$ to the base g. After converting $\alpha$, $\beta$ and h to produce $\alpha'$, $\beta'$ and $\gamma'$ as follows: $\alpha'=\alpha^r$; $\beta'=\beta^r$; and $\gamma'=h^{xr}$, the equality of a $\log_\alpha \alpha'$ and $\log_\beta \beta'$ and the equality of $\log_g \alpha'$ and $\log_h \gamma'$ are proved. The verifying mechanism verifies the equality of a $\log_\alpha \alpha'$ and $\log_\beta \beta'$ and the equality of $\log_g \alpha'$ and $\log_h \gamma'$. Then, the received $\beta'$ and $\gamma'$ are checked to determine the equality or inequality thereof, and it is determined whether the proof is acceptable, depending on the verification and the check results.

53 Claims, 19 Drawing Sheets

ZERO-KNOWLEDGE PROVING SYSTEM AND METHOD

BACKGROUND OF THE INVENTION

1. Field of the Invention

The present invention relates to zero-knowledge proving techniques for proving the equality or inequality of (discrete logarithms, which is suitable for use in undeniable signatures.

2. Description of the Related Art

Undeniable signatures proposed by Chaum have an important property such that a signer cannot deny the validity of a self-generated signature but a forged signature. The undeniable signature schemes like this make use of the group operation of an order-q group G on modulo p, where p and q are prime and have a relationship of q|(p−1). When $y=g^x$ is an element of the group G, the signer uses the generator g as a public key and x as a private key. A signature on a message m is obtained by calculating $SIG=m^x$, where x is the private key. For (m, SIG), the validity of the signature can be decided by proving the equality of the discrete logarithm x of the public key: $y=g^x$ and the discrete logarithm x' of $SIG=m^{x'}$. In contrast, the forgery of the signature can be decided by proving the inequality of SIG' and $m^x$ for (m, SIG'). Accordingly, such signature system needs a proving mechanism for proving the equality or inequality the above discrete logarithms and a verifying mechanism for verifying the results in a designated group operation.

There has been known the Chaum's scheme that allows a prover to convince the verifier about the equality or inequality of SIG' and $m^x$, which is disclosed in "Zero-knowledge undeniable signatures", Advances in Cryptology, Proceedings of Eurocrypt' 1990, LNCS473, Springer-Verlag, pp. 458–464, 1991. This Chaum's scheme, however, employs different proving systems to prove respective ones of the equality and inequality. Especially, the system of proving the inequality cannot be performed without the verifier and therefore it is impossible for the prover solely to prove the inequality.

There has been proposed another proving scheme that employs the same proving systems to prove both the equality and inequality. See "Efficient convertible undeniable signature schemes", Proceedings of 4th Annual Workshop on Selected Areas in Cryptography, SAC'97, August 1997. Although this scheme allows the prover solely to prove both the equality and inequality and the efficiency thereof has been qualitatively analyzed, it has a disadvantage of leaking important information. More specifically, the information $m^x$ is known by the verifier, loading to a contradiction such that, when indicating that a message m is not signed, the signature on m is involuntarily passed.

SUMMARY OF THE INVENTION

An object of the present invention is to provide a zero-knowledge proving system and method allowing the same protocol to be used to prove the equality or inequality of discrete logarithms and allowing the prover solely to prove it without leaking important information.

According to the present invention, a system includes a first mechanism for proving equality or inequality of two discrete logarithms and a second mechanism for verifying said equality or inequality. The first mechanism includes: a first public information memory storing a designated operation scheme, two input numbers (hereinafter, denoted by $\alpha$ and $\beta$), and two predetermined bases (hereinafter, denoted by g and h); a private information memory storing private information (hereafter, denoted by x) which is a discrete logarithm of $\alpha$ to the base g; a random number generator for generating a first random number (hereafter, denoted by r); a converter for converting the input number $\alpha$, the input number $\beta$ and the base h to produce $\alpha'$, $\beta'$ and $\gamma'$ using the first random number r and the private information x as follows:

$\alpha'=\alpha^r$;

$\beta'=\beta^r$; and $\gamma'=h^{xr}$, wherein said $\alpha'$, $\beta'$ and $\gamma'$ are sent to the second mechanism; and a proving section for proving equality of a discrete logarithm of $\alpha'$ to base $\alpha$ and a discrete logarithm of $\beta'$ to base $\beta$ and equality of a discrete logarithm of $\alpha'$ to the base g and a discrete logarithm of $\gamma'$ to the base h.

The second mechanism includes: a second public information memory storing the designated operation scheme, the two input numbers $\alpha$ and $\beta$, and the two predetermined bases g and h; a verifying section corresponding to the proving section, for verifying equality of a discrete logarithm of the received $\alpha'$ to base $\alpha$ and a discrete logarithm of the received $\beta'$ to base $\beta$, and equality of a discrete logarithm of the received $\alpha'$ to the base g and a discrete logarithm of the received $\gamma'$ to the base h; a checking section for checking the received $\beta'$ and $\gamma'$ to determine equality or inequality thereof; and a decision section for deciding whether proof of the first mechanism is acceptable, depending on results of the verifying section and the checking section.

According to an aspect of the present invention, the proving section may include: a first prover for proving the equality of the discrete logarithm of $\alpha'$ to base $\alpha$ and the discrete logarithm of $\beta'$ to base $\beta$; and a second prover for proving the equality of the discrete logarithm of $\alpha'$ to the base g and the discrete logarithm of $\gamma'$ to the base h, and the verifying section comprises: a first verifier corresponding to the first prover, for verifying the equality of the discrete logarithm of the received $\alpha'$ to base $\alpha$ and the discrete logarithm of the received $\beta'$ to base $\beta$; and a second verifier corresponding to the second prover, for verifying the equality of the discrete logarithm of the received $\alpha'$ to the base g and the discrete logarithm of the received $\gamma'$ to the base h.

In an embodiment, the checking section may include a third verifier for verifying the equality of the received $\beta'$ and $\gamma'$. In another embodiment, the checking section may include a third verifier for verifying the inequality of the received $\beta'$ and $\gamma'$. In still another embodiment, the checking section may include a comparator for comparing the received $\beta'$ and $\gamma'$.

According to another aspect of the present invention, the proving section may include a single prover for proving the equality of the discrete logarithm of $\alpha'$ to base $\alpha$ and the discrete logarithm of $\beta'$ to base $\beta$, and the equality of the discrete logarithm of $\alpha'$ to the base g and the discrete logarithm of $\gamma'$ to the base h. The verifying section may include a single verifier for verifying the equality of a discrete logarithm of the received $\alpha'$ to base $\alpha$ and a discrete logarithm of the received $\beta'$ to base $\beta$, and the equality of a discrete logarithm of the received $\alpha'$ to the base g and a discrete logarithm of the received $\gamma'$ to the base h.

In an embodiment, the checking section may include a verifier for verifying the equality of the received $\beta'$ and $\gamma'$. In another embodiment, the checking section may include a verifier for verifying the inequality of the received β' and γ'. In still another embodiment, the checking section may include a comparator for comparing the received β' and γ'.

DESCRIPTION OF THE PREFERRED EMBODIMENTS

In the preferred embodiments described below, p and q are primes, where $q|(p-1)$, and g, h, α and β are all elements of a group of order q on modulo p.

System Outlines

1. First Basic Scheme

Figure 1:
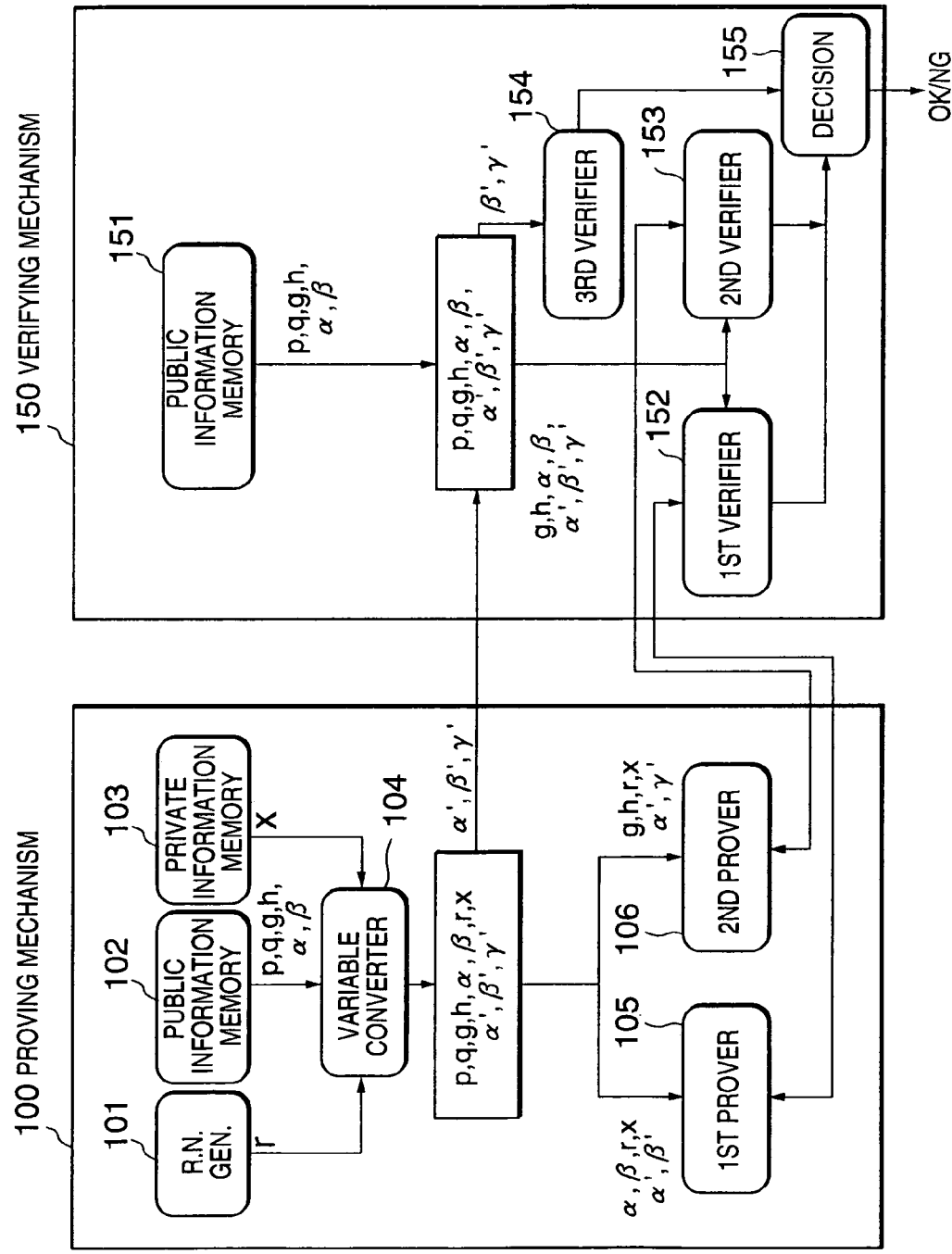
FIG. 1 is a schematic diagram showing a first basic scheme of a zero-knowledge proving system according to the present invention.

Referring to FIG. 1, the system has a proving mechanism 100 and a verifying mechanism 150. The proving mechanism 100 includes a random number generator 101, a public information memory 102, a private information memory 103, and a variable converter 104.

The random number generator 101 generates a random number $r \in Z/qZ$.

The public information memory 102 stores p, q, g, h, α and β, where p and q indicates the group operation, g and h are first and second bases, respectively, and α and β are input numbers. The same public information are stored in a public information memory 151 of the verifying mechanism 150.

The private information memory 103 stores private information x satisfying $\alpha = g^x \mod p$, which is the discrete logarithm of α to the base g, that is, $x = \log_g \alpha$.

The random number generator 101, the public information memory 102 and the private information memory 103 output p, q, g, h, α, β, x, and r to the variable converter 104.

The variable converter 104 uses these variables to produce α', β', γ' as follows:

$\alpha' = \alpha^r \mod p;$ $\beta' = \beta^r \mod p;$ and $\gamma' = h^{xr} \mod p.$ The proving mechanism 100 sends these α', β', γ' to the verifying mechanism 150.

The proving mechanism 100 further includes a first prover 105 and a second prover 106. The first prover 105 proves the equality of the discrete logarithms of α' to the base α and β' to the base β. The second prover 106 proves the equality of the discrete logarithms of α' to the base g and γ' to the base h.

The verifying mechanism 150 further includes a first verifier 152, a second verifier 153, a third verifier 154, and a decision section 155.

The first verifier 152 verifies about the equality of the discrete logarithms of α' to the base α and β' to the base β and, if the equality is verified, then the verification acceptance is determined. The second verifier 153 verifies about the equality of the discrete logarithms of α' to the base g and γ' to the base h and, if the equality is verified, then the verification acceptance is determined. The third verifier 154 verifies about the equality of β' and γ' and, if it is verified that β'=γ', then the verification acceptance is determined.

The decision section 155 decides the equality of the discrete logarithms of α to the base g and β to the base h when the verification results of the first to third verifiers 152–154 are all verification acceptances. When the equality is decided, the decision section 155 outputs "OK" and otherwise "NG".

2. Second Basic Scheme

Figure 2:
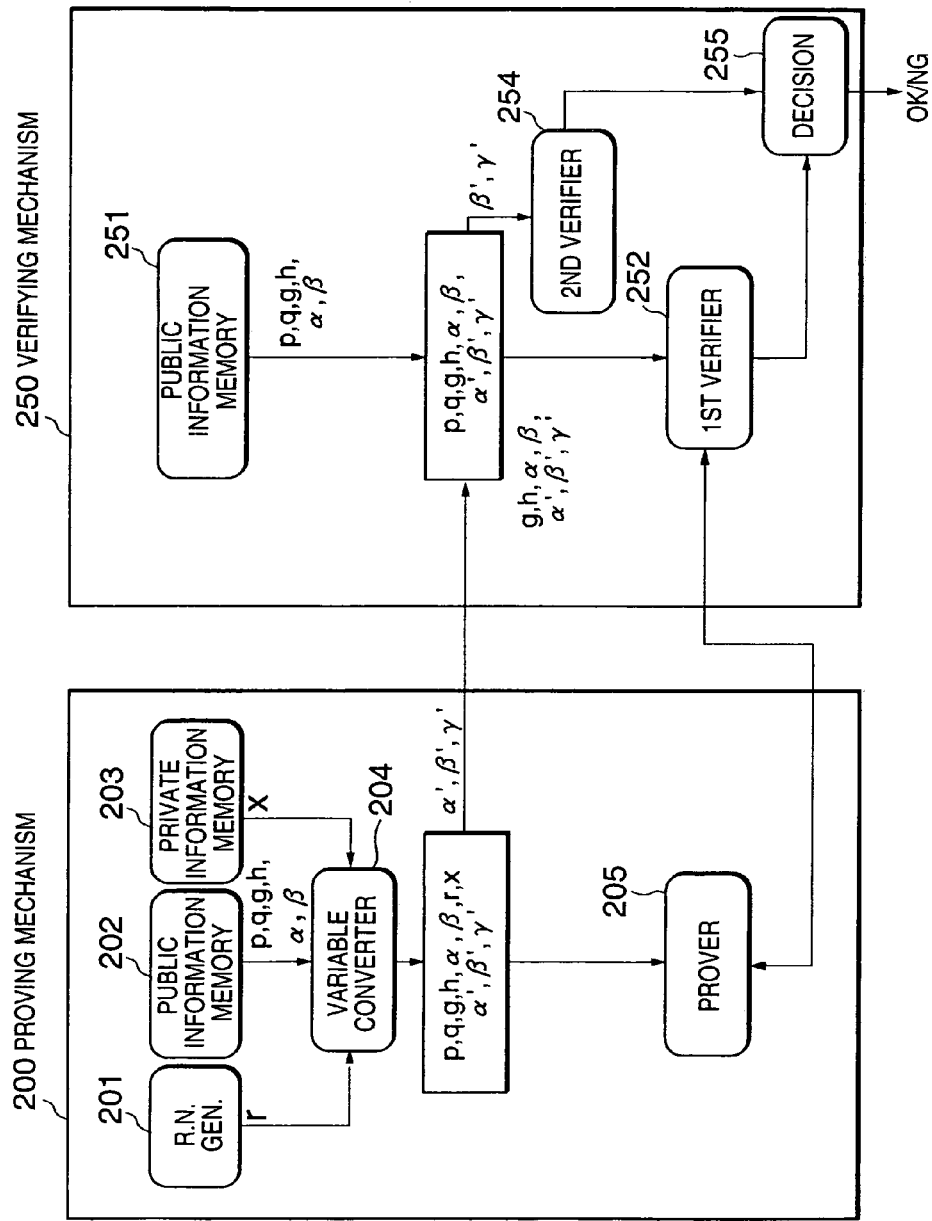
FIG. 2 is a schematic diagram showing a second basic scheme of a zero-knowledge proving system according to the present invention.

Referring to FIG. 2, the system has a proving mechanism 200 and a verifying mechanism 250. The proving mechanism 200 includes a random number generator 201, a public information memory 202, a private information memory 203, and a variable converter 204.

The random number generator 201 generates a random number $r \in Z/qZ$.

The public information memory 202 stores p, q, g, h, $\alpha$ and $\beta$. The same public information are stored in a public information memory 251 of the verifying mechanism 250.

The private information memory 203 stores private information x satisfying $\alpha = g^x \mod p$, which is the discrete logarithm of $\alpha$ to the base q, that is, $x = \log_g \alpha$.

The random number generator 201, the public information memory 202 and the private information memory 203 output p, q, g, h, $\alpha$, $\beta$, x, and r to the variable converter 204.

The variable converter 204 uses these variables to produce $\alpha'$, $\beta'$, $\gamma'$ as follows:

$$\alpha' = \alpha^r \mod p;$$

$$\beta' = \beta^r \mod p; \text{ and}$$

$$\gamma' = h^{xr} \mod p.$$

The proving mechanism 200 sends these $\alpha'$, $\beta'$ and $\gamma'$ to the verifying mechanism 250.

The proving mechanism 200 further includes a prover 205, which proves the equality of the discrete logarithms of $\alpha'$ to the base $\alpha$ and $\beta'$ to the base $\beta$ and the equality of the discrete logarithms of $\alpha'$ to the base g and $\gamma'$ to the base h.

The verifying mechanism 250 further includes a first verifier 252, a second verifier 254, and a decision section 255. The first verifier 252 verifies about the equality of the discrete logarithms of $\alpha'$ to the base $\alpha$ and $\beta'$ to the base $\beta$ and the equality of the discrete logarithms of $\alpha'$ to the base g and $\gamma'$ to the base h. If these equalities are both verified, then the verification acceptance is determined. The second verifier 254 verifies about the equality of $\beta'$ and $\gamma'$ and, if it is verified that $\beta' = \gamma'$, then the verification acceptance is determined.

The decision section 255 decides the equality of the discrete logarithms of $\alpha$ to the base g and $\beta$ to the base h when the verification results of the first and second verifiers 252 and 254 are all verification acceptances. When the equality is decided, the decision section 255 outputs "OK" and otherwise "NG".

3. Third Basic Scheme

Figure 3:
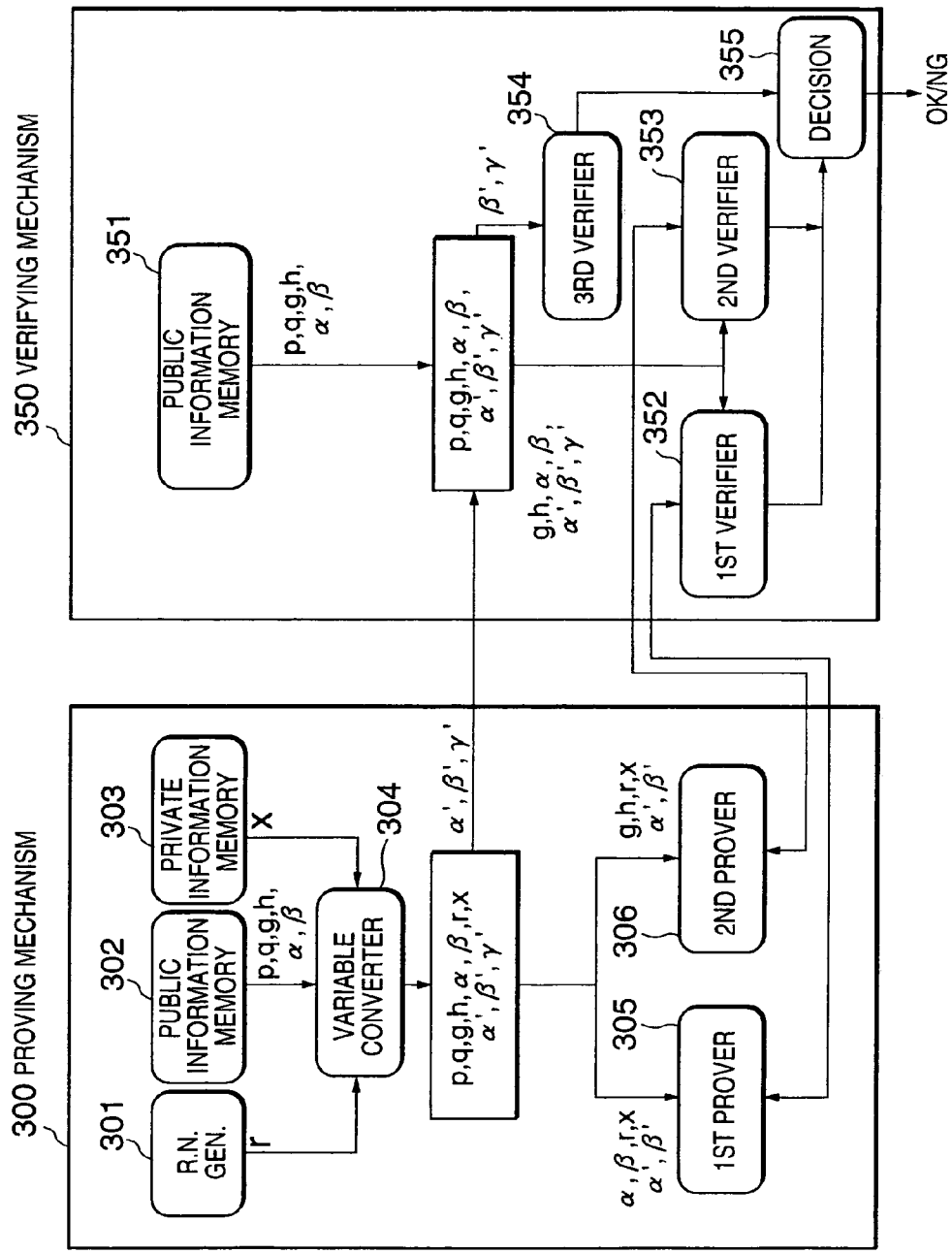
FIG. 3 is a schematic diagram showing a third basic scheme of a zero knowledge proving system according to the present invention.

Referring to FIG. 3, the system has a proving mechanism 300 and a verifying mechanism 350. The proving mechanism 300 includes a random number generator 301, a public information memory 302, a private information memory 303, and a variable converter 304.

The random number generator 301 generates a random number $r \in Z/qZ$.

The public information memory 302 stores p, q, g, h, $\alpha$ and $\beta$. The same public information are stored in a public information memory 351 of the verifying mechanism 350.

The private information memory 303 stores private information x satisfying $\alpha = g^x \mod p$, which is the discrete logarithm of $\alpha$ to the base g, that is, $x = \log_g \alpha$.

The random number generator 301, the public information memory 302 and the private information memory 303 output p, q, g, h, $\alpha$, $\beta$, x, and r to the variable converter 304.

The variable converter 304 uses these variables to produce $\alpha'$, $\beta'$, $\gamma'$ as follows:

$$\alpha' = \alpha^r \mod p;$$

$$\beta' = \beta^r \mod p; \text{ and}$$

$$\gamma' = h^{xr} \mod p.$$

The proving mechanism 300 sends these $\alpha'$, $\beta'$ and $\gamma'$ to the verifying mechanism 350.

The proving mechanism 300 further includes a first prover 305 and a second prover 306. The first prover 305 proves the equality of the discrete logarithms of $\alpha'$ to the base $\alpha$ and $\beta'$ to the base $\beta$. The second prover 306 proves the equality of the discrete logarithms of $\alpha'$ to the base g and $\gamma'$ to the base h.

The verifying mechanism 350 further includes a first verifier 352, a second verifier 353, a third verifier 354, and a decision section 355.

The first verifier 352 verifies about the equality of the discrete logarithms of $\alpha'$ to the base $\alpha$ and $\beta'$ to the base $\beta$ and, if the equality is verified, then the verification acceptance is determined. The second verifier 353 verifies about the equality of the discrete logarithms of $\alpha'$ to the base g and $\gamma'$ to the base h and, if the equality is verified, then the verification acceptance is determined.

The third verifier 354 verifies about the inequality of $\beta'$ and $\gamma'$ and, if it is verified that $\beta' \neq \gamma'$, then the verification acceptance is determined.

The decision section 355 decides the inequality of the discrete logarithms of $\alpha$ to the base g and $\beta$ to the base h when the verification results of the first to third verifiers 352–354 are all verification acceptances. When the inequality is decided, the decision section 355 outputs "OK" and otherwise "NG".

4. Fourth Basic Scheme

Figure 4:
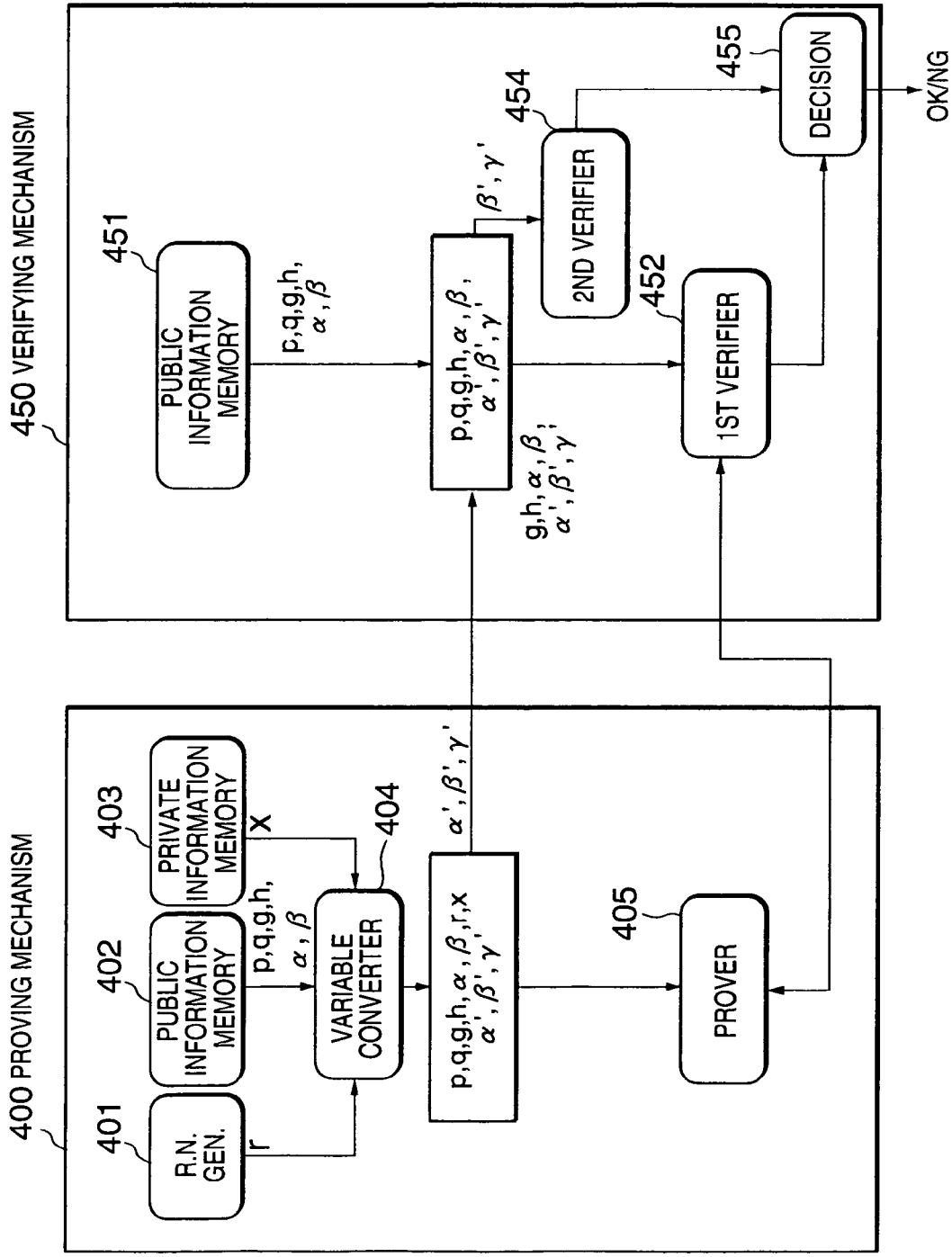
FIG. 4 is a schematic diagram showing a fourth basic scheme of a zero-knowledge proving system according to the present invention.

Referring to FIG. 4, the system has a proving mechanism 400 and a verifying mechanism 450. The proving mechanism 400 includes a random number generator 401, a public information memory 402, a private information memory 403, and a variable converter 404.

The random number generator 401 generates a random number $r \in Z/qZ$.

The public information memory 402 stores p, q, g, h, $\alpha$ and $\beta$. The same public information are stored in a public information memory 451 of the verifying mechanism 450.

The private information memory 403 stores private information x satisfying $\alpha = g^x \mod p$, which is the discrete logarithm of $\alpha$ to the base g, that is, $x = \log_g \alpha$.

The random number generator 401, the public information memory 402 and the private information memory 403 output p, q, g, h, $\alpha$, $\beta$, x, and r to the variable converter 404.

The variable converter 404 uses these variables to produce $\alpha'$, $\beta'$, $\gamma'$ as follows:

$$\alpha' = \alpha^r \mod p;$$

$$\beta' = \beta^r \mod p; \text{ and}$$

$$\gamma' = h^{xr} \mod p.$$

The proving mechanism 400 sends these $\alpha'$, $\beta'$ and $\gamma'$ to the verifying mechanism 450.

The proving mechanism 400 further includes a prover 405, which proves the equality of the discrete logarithms of $\alpha'$ to the base $\alpha$ and $\beta'$ to the base $\beta$ and the equality of the discrete logarithms of $\alpha'$ to the base g and $\gamma'$ to the base h.

The verifying mechanism 450 further includes a first verifier 452, a second verifier 454, and a decision section 455. The first verifier 452 verifies about the equality of the discrete logarithms of $\alpha'$ to the base $\alpha$ and $\beta'$ to the base $\beta$ and the equality of the discrete logarithms of $\alpha'$ to the base g and $\gamma'$ to the base h. If these equalities are both verified, then the verification acceptance is determined.

The second verifier 454 verifies about the inequality of $\beta'$ and $\gamma'$ and, if it is verified that $\beta'\neq\gamma'$, then the verification acceptance is determined.

The decision section 355 decides the inequality of the discrete logarithms of $\alpha$ to the base g and $\beta$ to the base h when the verification results of the first to third verifiers 352–354 are all verification acceptances. When the inequality is decided, the decision section 355 outputs "OK" and otherwise "NG".

5. Fifth Basic Scheme

Figure 5:
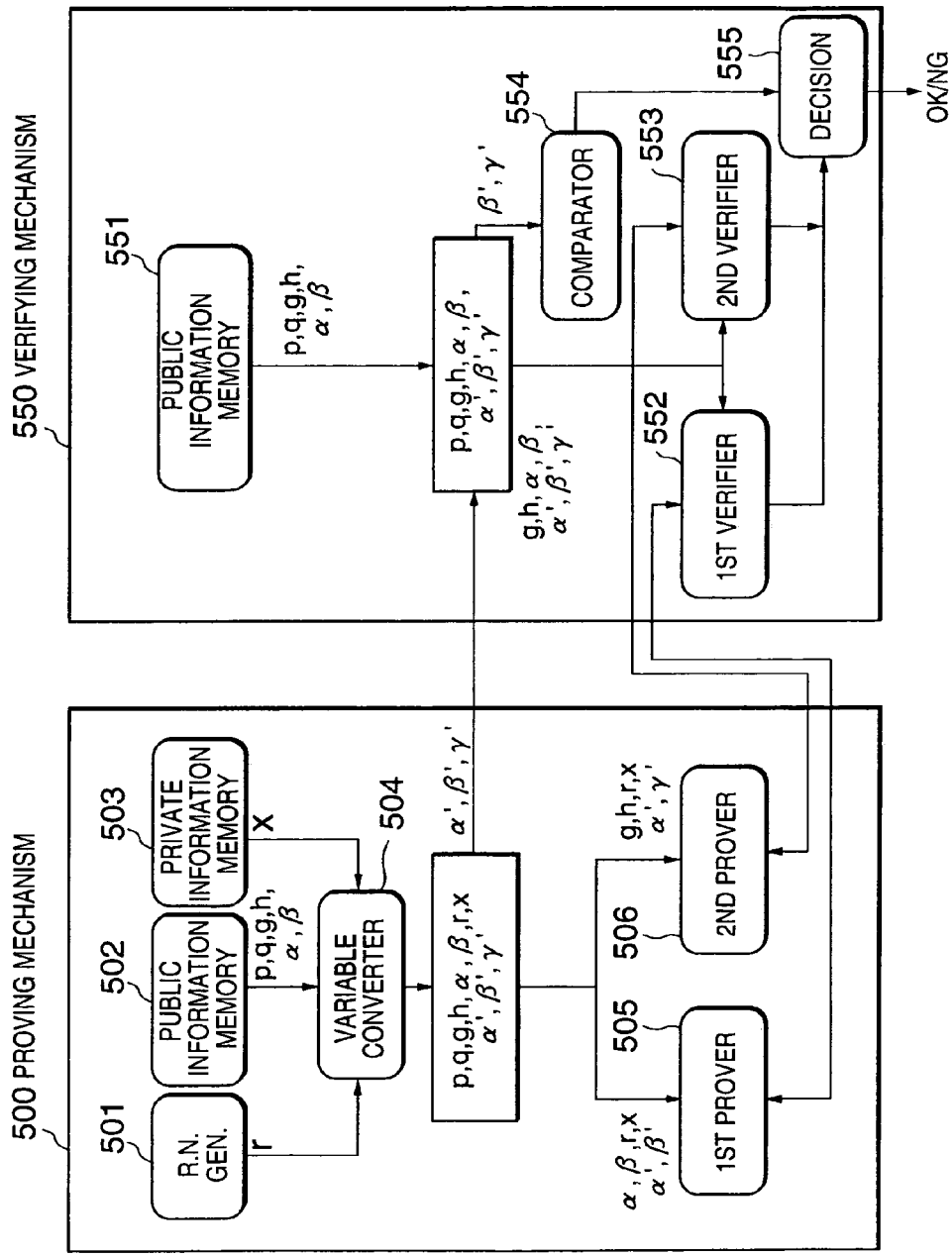
FIG. 5 is a schematic diagram showing a fifth basic scheme of a zero-knowledge proving system according to the present invention.

Referring to FIG. 5, the system has a proving mechanism 500 and a verifying mechanism 550. The proving mechanism 500 includes a random number generator 501, a public information memory 502, a private information memory 503, and a variable converter 504.

The random number generator 501 generates a random number $r\in Z/qZ$.

The public information memory 502 stores p, q, g, h, $\alpha$ and $\beta$, where p and q indicates the group operation, g and h are first and second bases, respectively, and $\alpha$ and $\beta$ are input numbers. The same public information are stored in a public information memory 551 of the verifying mechanism 550.

The private information memory 503 stores private information x satisfying $\alpha=g^x$ mod p, which is the discrete logarithm of $\alpha$ to the base g, that is, $x=\log_g\alpha$.

The random number generator 501, the public information memory 502 and the private information memory 503 output p, q, g, h, $\alpha$, $\beta$, x, and r to the variable converter 504.

The variable converter 504 uses these variables to produce $\alpha'$, $\beta'$, $\gamma'$ as follows:

$$\alpha'=\alpha^r \text{ mod } p;$$

$$\beta'=\beta^r \text{ mod } p; \text{ and}$$

$$\gamma'=h^{xr} \text{ mod } p.$$

The proving mechanism 500 sends these $\alpha'$, $\beta'$ and $\gamma'$ to the verifying mechanism 550.

The proving mechanism 500 further includes a first prover 505 and a second prover 506. The first prover 505 proves the equality of the discrete logarithms of $\alpha'$ to the base $\alpha$ and $\beta'$ to the base $\beta$. The second prover 506 proves the equality of the discrete logarithms of $\alpha'$ to the base g and $\gamma'$ to the base h.

The verifying mechanism 550 further includes a first verifier 552, a second verifier 553, a comparator 554, and a decision section 555.

The first verifier 552 verifies about the equality of the discrete logarithms of $\alpha'$ to the base $\alpha$ and $\beta'$ to the base $\beta$ and, if the equality is verified, then the verification acceptance is determined. The second verifier 553 verifies about the equality of the discrete logarithms of $\alpha'$ to the base g and $\gamma'$ to the base h and, if the equality is verified, then the verification acceptance is determined. The comparator 554 compares $\beta'$ and $\gamma'$ to determine whether $\beta'\neq\gamma'$.

The decision section 555 decides the inequality of the discrete logarithms of $\alpha$ to the base g and $\beta$ to the base h when the verification results of the first and verifiers 552 and 553 are all verification acceptances and the comparator 554 determine that $\beta'\neq\gamma'$. When the comparator 554 determine that $\beta'=\gamma'$, the decision section 555 decides the equality of the discrete logarithms of $\alpha$ to the base g and $\beta$ to the base h.

6. Sixth Basic Scheme

Figure 6:
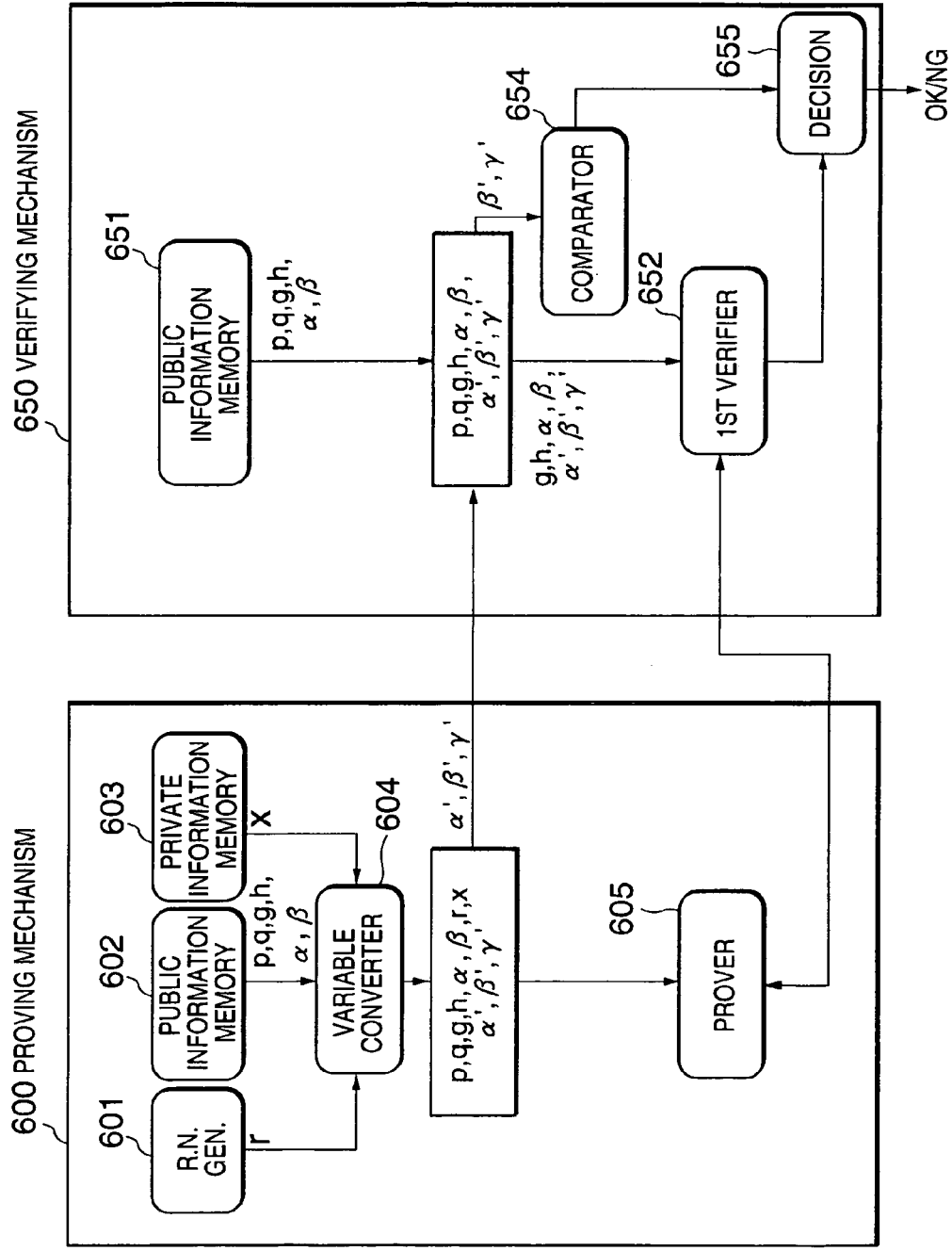
FIG. 6 is a schematic diagram showing a sixth basic scheme of a zero-knowledge proving system according to the present invention.

Referring to FIG. 6, the system has a proving mechanism 600 and a verifying mechanism 650. The proving mechanism 600 includes a random number generator 601, a public information memory 602, a private information memory 603, and a variable converter 604.

The random number generator 601 generates a random number $r\in Z/qZ$.

The public information memory 602 stores p, q, g, h, $\alpha$ and $\beta$. The same public information are stored in a public information memory 651 of the verifying mechanism 650.

The private information memory 603 stores private information x satisfying $\alpha=g^x$ mod p, which is the discrete logarithm of $\alpha$ to the base g, that is, $x=\log_g\alpha$.

The random number generator 601, the public information memory 602 and the private information memory 603 output p, q, g, h, $\alpha$, $\beta$, x, and r to the variable converter 604.

The variable converter 604 uses these variables to produce $\alpha'$, $\beta'$, $\gamma'$ as follows:

$$\alpha'=\alpha^r \text{ mod } p;$$

$$\beta'=\beta^r \text{ mod } p; \text{ and}$$

$$\gamma'=h^{xr} \text{ mod } p.$$

The proving mechanism 600 sends these $\alpha'$, $\beta'$ and $\gamma'$ to the verifying mechanism 650.

The proving mechanism 600 further includes a prover 605, which proves the equality of the discrete logarithms of $\alpha'$ to the base $\alpha$ and $\beta'$ to the base $\beta$ and the equality of the discrete logarithms of $\alpha'$ to the base g and $\gamma'$ to the base h.

The verifying mechanism 650 further includes a first verifier 652, a comparator 654, and a decision section 655. The first verifier 652 verifies about the equality of the discrete logarithms of $\alpha'$ to the base $\alpha$ and $\beta'$ to the base $\beta$ and the equality of the discrete logarithms of $\alpha'$ to the base g and $\gamma'$ to the base h. If these equalities are both verified, then the verification acceptance is determined. The comparator 654 compares $\beta'$ and $\gamma'$ to determine whether $\beta'\neq\gamma'$.

The decision section 655 decides the inequality of the discrete logarithms of $\alpha$ to the base g and $\beta$ to the base h when the verification result of the first verifier 652 is verification acceptances and the comparator 654 determine that $\beta'\neq\gamma'$. When the comparator 654 determine that $\beta'=\gamma'$, the decision section 555 decides the equality of the discrete logarithms of $\alpha$ to the base g and $\beta$ to the base h.

Embodiments

1. First Embodiment 1.1) System Configuration

Figure 7:
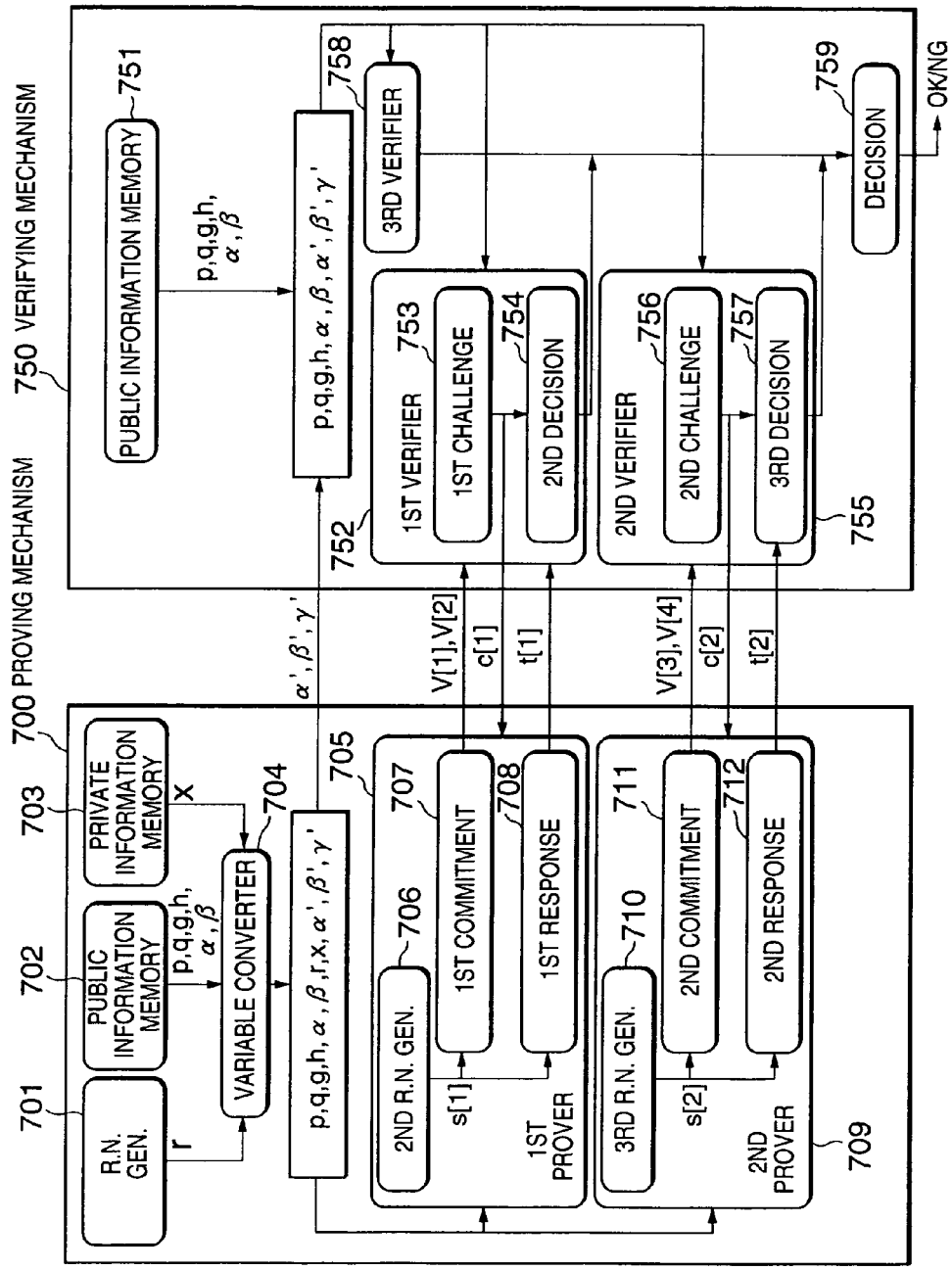
FIG. 7 is a block diagram showing a zero-knowledge proving system according to a first embodiment of the present invention.

Referring to FIG. 7, the system has a proving mechanism 700 and a verifying mechanism 750. The proving mechanism 700 includes a random number generator 701, a public information memory 702, a private information memory 703, a variable converter 704, a first prover 705 and a second prover 709. The first prover 705 includes a second random number generator 706, a first commitment section 707, and a first response section 708. The second prover 709 includes a third random number generator 710, a second commitment section 711, and a second response section 712. The random number generator 701, the variable converter 704, the first prover 705 and the second prover 709 may be implemented by running corresponding programs on a computer.

The verifying mechanism 750 includes a public information memory 751, a first verifier 752, a second verifier 755, a third verifier 758, and a decision section 759. The first verifier 752 includes a first challenge section 753 and a second decision section 754. The second verifier 755 includes a second challenge section 756 and a third decision section 757. The first verifier 752, the second verifier 755, the third verifier 758, and the decision section 759 may be implemented by running corresponding programs on a computer.

The first prover 705 and the first verifier 752 communicate with each other such that first commitments v[1] and v[2] are sent from the first prover 705 to the first verifier 752, a first challenge c[1] is sent from the first verifier 752 back to the first prover 705, and a first response t[1] is sent from the first prover 705 to the first verifier 752. The first verifier 752 determines whether the first response t[1] is consistent with the first commitments v[1] and v[2] and the first challenge c[1].

The second prover 709 and the second verifier 755 communicate with each other such that second commitments v[3] and v[4] is sent from the second prover 709 to the second verifier 755, a second challenge c[2] is sent from the second verifier 755 back to the second prover 709, and a second response t[2] is sent from the second prover 709 to the second verifier 755. The second verifier 755 determines whether the second response t[2] is consistent with the second commitments v[3] and v[4] and the second challenge c[2].

1.2) Operation

An operation of the present embodiment will be described in detail.

The random number generator 701 generates a random number $R \in Z/qZ$.

The public information memory 702 stores p, q, g, h, $\alpha$ and $\beta$. The same public information are stored in a public information memory 751 of the verifying mechanism 750.

The private information memory 703 stores private information x satisfying $\alpha = g^x$ mod p, which is the discrete logarithm of $\alpha$ to the base g, that is, $x = \log_g \alpha$.

The random number generator 701, the public information memory 702 and the private information memory 703 output p, q, g, h, $\alpha$, $\beta$, x, and r to the variable converter 704. The variables p, q, g, h, $\alpha$ and $\beta$ are also referred by the first prover 705 and the second prover 709.

The variable converter 704 uses these variables to produce $\alpha'$, $\beta'$, $\gamma'$ as follows:

$\alpha' = \alpha^r$;

$\beta' = \beta^r$; and $\gamma' = h^{xr}$.

The proving mechanism 700 sends these $\alpha'$, $\beta'$ and $\gamma'$ to the verifying mechanism 750. These $\alpha'$, $\beta'$ and $\gamma'$ are also referred by the first prover 705, the second prover 709, the first to third verifiers 752, 756 and 758.

1.3) First Prover/Verifier

In the first prover 705, the second random number generator 706 generates a random numbers $s[1] \in Z/qZ$. The first commitment section 707 uses the second random number s[1] to compute the first commitments v[1] and v[2]:

$v[1] = \alpha^{s[1]}$ mod p; and $v[2] = \beta^{s[1]}$ mod p.

The first commitment section 707 sends the first commitments v[1] and v[2] to the first verifier 752 of the verifying mechanism 750.

In the first verifier 752, after having received the first commitments v[1] and v[2], the first challenge section 753 randomly generates a first challenge $c[1] \in Z/qZ$ and sends it back to the first prover 705 of the proving mechanism 700.

When having received the first challenge c[1], the first response section 708 of the first prover 705 computes a first response t[1]:

$t[1] = s[1] + rc[1]$ mod q.

The first response t[1] is sent to the first verifier 752 of the verifying mechanism 750.

In the first verifier 752, the second decision section 754 decides whether $v[1]\alpha'^c = \alpha'^{t[1]}$ mod p; and $v[2]\beta'^c = \beta'^{t[1]}$ mod p.

If the equality is verified, then the verification acceptance is determined.

1.4) Second Prover/Verifier

In the second prover 709, the third random number generator 710 generates a random number $s[2] \in Z/qZ$. The second commitment section 711 uses the third random number s[2] to compute the second commitments v[3] and v[4]:

$v[3] = g^{s[2]}$ mod p; and $v[4] = h^{s[2]}$ mod p.

The second commitment section 711 sends the second commitments v[3] and v[4] to the second verifier 755 of the verifying mechanism 750.

In the second verifier 755, after having received the second commitments v[3] and v[4], the second challenge section 756 randomly generates a second challenge $c[2] \in Z/qZ$ and sends it back to the second prover 709 of the proving mechanism 700.

When having received the second challenge c[2], the second response section 712 of the second prover 709 computes a second response t[2]:

$t[2] = s[2] + xrc[2]$ mod q, where x is private information stored in the private information memory 702 and r is a random number generated by the random number generator 701. The second response t[2] is sent to the second verifier 755 of the verifying mechanism 750.

In the second verifier 755, the third decision section 757 decides whether $v[3]\alpha'^c = g'^{t[2]}$ mod p; and $v[4]\gamma'^c = h'^{t[2]}$ mod p.

If the equality is verified, then the verification acceptance is determined.

1.5) Decision

The third verifier 758 verifies about the equality of $\beta'$ and $\gamma'$ and, if it is verified that $\beta' = \gamma'$, then the verification acceptance is determined.

The decision section 759 outputs "OK" when the verification results of the first to third verifiers 754, 757 and 758 are all verification acceptances. Otherwise the decision section 759 outputs "NG".

$\alpha'$, $\beta'$ and $\gamma'$ may be sent to the verifying mechanism 750 at the same time when the first commitments v[1] and v[2] are sent to the verifying mechanism 750. The first commitments v[1] and v[2] may be sent to the verifying mechanism 750 at the same time when the second commitments v[3] and v[4] are sent. Thereafter, the first challenge c[1] and the second challenge c[2] may be simultaneously sent back to the proving mechanism 700. After having sent the first and second challenges c[1] and c[2], the first and second responses t[1] and t[2] may be simultaneously sent to the verifying mechanism 750.

The present embodiment provides a zero-knowledge proving scheme for proving the equality of the discrete logarithms. However, the third verifier 758 may verify about the inequality of β' and γ' and, if it is verified that β'≠γ', then the verification acceptance is determined. In this case, the present embodiment also provides a zero-knowledge proving scheme for proving the inequality of the discrete logarithms.

2. Second Embodiment 2.1) System Configuration

Figure 8:
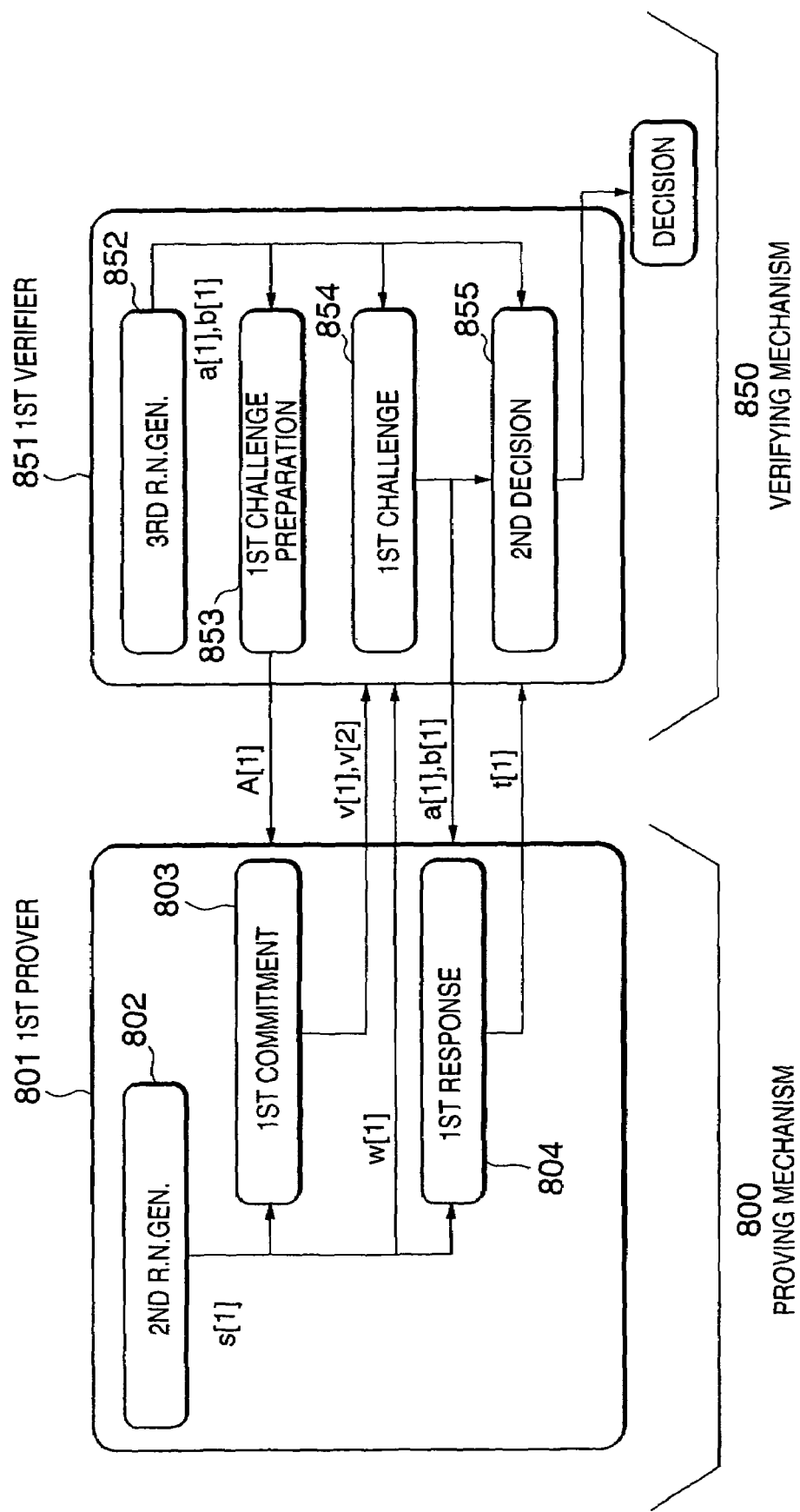
FIG. 8 is a block diagram showing first prover and first verifier in a zero-knowledge proving system according to a second embodiment of the present invention.

Referring to FIG. 8, the system according to the second embodiment includes a proving mechanism 800 and a verifying mechanism 850, in which a first prover 801 and a first verifier 851 are different from those of the first embodiment as shown in FIG. 7, Therefore, FIG. 8 shows only the first prover 801 and the first verifier 851, and other functional blocks are the same as shown in FIG. 7.

The first prover 801 includes a second random number generator 802, a first commitment section 803, and a first response section 804. The first verifier 851 includes a first challenge preparation section 853, a first challenge section 854 and a second decision section 855. As in the case of the first embodiment, the first prover 801 and a first verifier 851 may be implemented by running corresponding programs on a computer.

The first prover 801 and the first verifier 851 communicate with each other such that first challenge preparation is sent from the first verifier 851 to the first prover 801, first commitment v[1] and v[2] and random number w[1] are sent from the first prover 801 to the first verifier 851, first challenge a[1] and b[1] are send from the first verifier 851 back to the first prover 801, and a first response t[1] is sent from the first prover 801 to the first verifier 851. The first verifier 851 determines whether the first response t[1] is consistent with the first commitments v[1] and v[2], the random number w[1] and the first challenges a[1] and b[1]. More detailed operation of the present embodiment will be described below.

2.2) Operation

In the first verifier 851, the third random number generator 852 generates random numbers a[1], b[1]∈Z/qZ.

The first challenge preparation section 853 uses the random numbers a[1], b[1] to compute first challenge preparation A[1]:

$$A[1]=g^{a[1]}\alpha^{b[1]} \bmod p.$$

The first challenge preparation A[1] is sent to the first prover 801.

In the first prover 801, the second random number generator 802 generates random numbers s[1]∈Z/qZ and w[1]∈Z/qZ. The first commitment section 803 uses the random number s[1] to compute the first commitments v[1] and v[2]:

$$v[1]=\alpha^{s[1]} \bmod p; \text{ and}$$

$$v[2]=\beta^{s[1]} \bmod p.$$

After having received the first challenge preparation A[1] from the first verifier 851, the first commitment section 803 sends the first commitments v[1] and v[2] and the random number w[1] to the first verifier 851.

In the first verifier 851, when having received the first commitments v[1] and v[2] and the random number w[1], the first challenge section 854 sends the random numbers a[1], b[1] as the first challenge to the first prover 801.

When having received the first challenges a[1], b[1], the first response section 804 computes $g^{a[1]}\alpha^{b[1]}$ mod p and proves:

$$A[1]=g^{a[1]}\alpha^{b[1]} \bmod p.$$

If the equality of A[1] and $g^{a[1]}\alpha^{b[1]}$ mod p is not proved, then the proof is terminated.

When the equality of A[1] and $g^{a[1]}\alpha^{b[1]}$ mod p is proved, the first response section 804 computes a first response t[1]:

$$t[1]=s[1]+r(a[1]+w[1]) \bmod q,$$

where r is a random number generated by the random number generator 701. The first response t[1] is sent to the first verifier 851.

In the first verifier 851, the second decision section 855 decides whether $$v[1]\alpha'^{\{a[1]+w[1]\}}=\alpha'^{t[1]} \bmod p; \text{ and}$$

$$v[2]\beta'^{\{a[1]+w[1]\}}=\beta'^{t[1]} \bmod p.$$

If the equality is verified, then the verification acceptance is determined.

3. Third Embodiment 3.1) System Configuration

Figure 9:
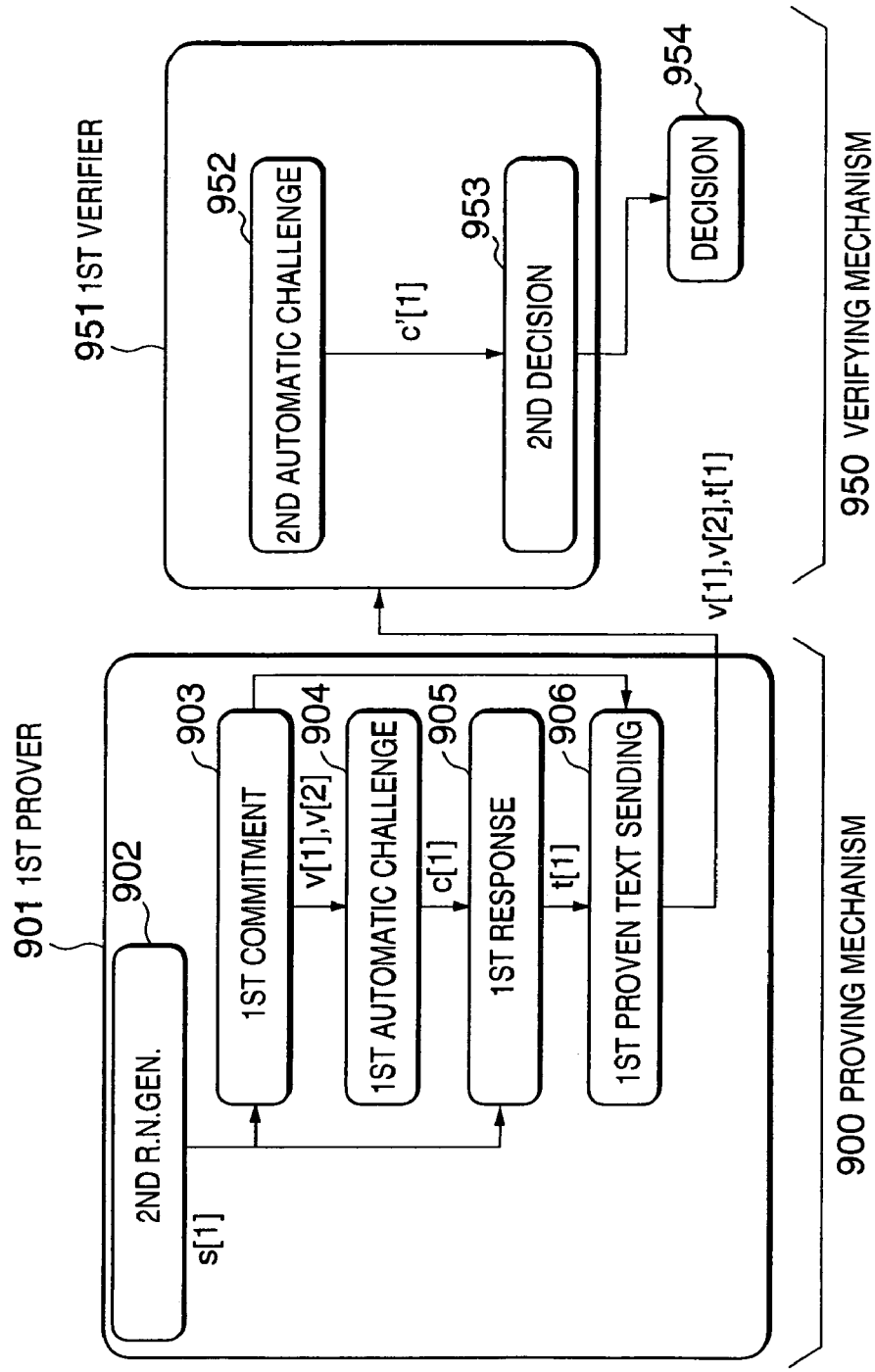
FIG. 9 is a block diagram showing first prover and first verifier in a zero-knowledge proving system according to a third embodiment of the present invention.

Referring to FIG. 9, the system according to the third embodiment includes a proving mechanism 900 and a verifying mechanism 950, in which a first prover 901 and a first verifier 951 are different from those of the first embodiment as shown in FIG. 7. Therefore, FIG. 9 shows only the first prover 901 and the first verifier 951, and other functional blocks are the same as shown in FIG. 7.

The first prover 901 includes a second random number generator 902, a first commitment section 903, a first automatic challenge section 904, a first response section 905, and a first proven text sending section 906. The first verifier 951 includes a first automatic challenge section 952 and a second decision section 953.

The first commitment section 903 uses a random number s[1] to convert α and β to produce first commitments v[1] and v[2]. The first automatic challenge section 904 produces first automatic challenge c[1] from the first commitments v[1] and v[2]. The first response section 905 computes first response t[1] from the first automatic challenge c[1] using the random number r and the random number s[1]. The first proven text sending section 906 sends the first commitments v[1] and v[2] and the first response t[1] as a first proven text to the first verifier 951.

In the first verifier 951, the first automatic challenge section 952 produces first automatic challenge c'[1] from the first commitments v[1] and v[2]. The second decision section 953 determines whether the first response t[1] is consistent with the first commitments v[1] and v[2] and the first automatic challenge c'[1].

As in the case of the first embodiment, the first prover 901 and the first verifier 951 may be implemented by running corresponding programs on a computer. More detailed operation of the present embodiment will be described below.

3.2) Operation

In the first prover 901, the second random number generator 902 generates random numbers s[1]∈Z/qZ. The first commitment section 903 uses the random number s[1] to compute the first commitments v[1] and v[2]:

$$v[1]=\alpha^{s[1]} \bmod p; \text{ and}$$

$$v[2]=\beta^{s[1]} \bmod p.$$

The first automatic challenge section 904 produces first automatic challenge c[1] using the first commitment v[1] and v[2]:

$$c[1](\in Z/qZ) = \text{Hash}(p, q, g, h, \alpha, \beta, \alpha', \beta', \gamma', v[1], v[2]),$$

where Hash indicates a hash function such as "SHA-1", which is a one-directional function.

The first response section 905 computes a first response t[1]:

$$t[1]=s[1]+rc[1] \bmod q,$$

where r is a random number generated by the random number generator 701.

The first proven text sending section 906 produces a proven text (v[1], v[2], t[1]) and send it to the first verifier 951.

In the first verifier 951, the first automatic challenge section 952 produces first automatic challenge c'[1]:

$$c'[1](\in Z/qZ) = \text{Hash}(p, q, g, h, \alpha, \beta, \alpha', \beta', \gamma', v[1], v[2]).$$

Thereafter, the second decision section 953 decides whether $$v[1]\alpha'^{c'[1]}=\alpha^{t[1]} \bmod p; \text{ and}$$

$$v[2]\beta'^{c'[1]}=\beta^{t[1]} \bmod p.$$

If the equality is verified, then the verification acceptance is determined.

4. Fourth Embodiment 4.1) System Configuration

Figure 10:
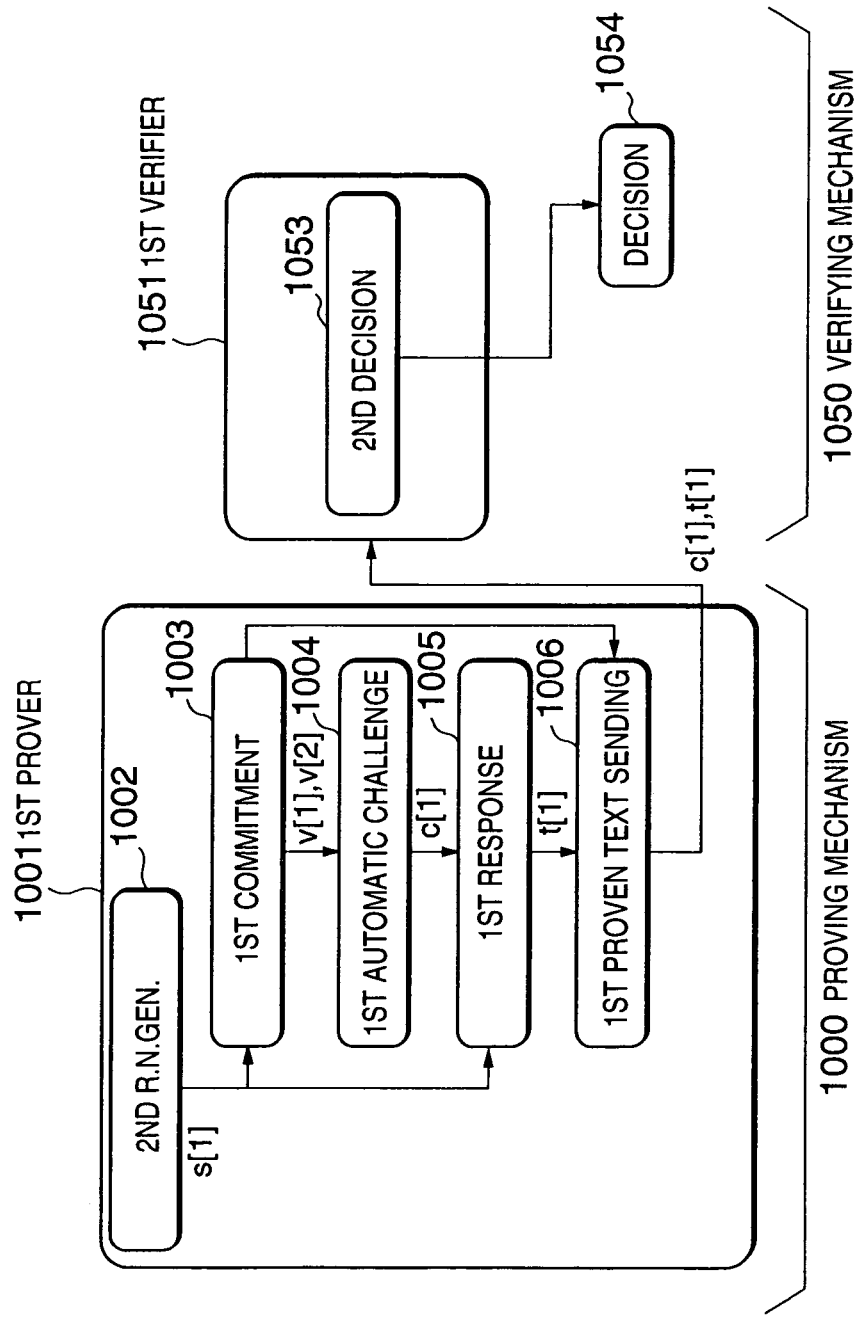
FIG. 10 is a block diagram showing first prover and first verifier in a zero-knowledge proving system according to a fourth embodiment of the present invention.

Referring to FIG. 10, the system according to the fourth embodiment includes a proving mechanism 1000 and a verifying mechanism 1050, in which a first prover 1001 and a first verifier 1051 are different from those of the first embodiment as shown in FIG. 7. Therefore, FIG. 10 shows only the first prover 1001 and the first verifier 1051, and other functional blocks are the same as shown in FIG. 7.

The first prover 1001 includes a second random number generator 1002, a first commitment section 1003, a first automatic challenge section 1004, a first response section 1005, and a first proven text sending section 1006. The first verifier 1051 includes a second decision section 1053.

The first commitment section 1003 uses a random number s[1] to convert α and β to produce first commitments v[1] and v[2]. The first automatic challenge section 1004 produces first automatic challenge c[1] from the first commitment v[1] and v[2]. The first response section 1005 computes first response t[1] from the first automatic challenge c[1] using the random number r and the random number s[1]. The first proven text sending section 1006 sends the first automatic challenge c[1] and the first response t[1] as a first proven text to the first verifier 1051.

In the first verifier 1051, the second decision section 1053 determines whether the first automatic challenge c[1] is consistent with the first response t[1].

As in the case of the first embodiment, the first prover 1001 and the first verifier 1051 may be implemented by running corresponding programs on a computer. More detailed operation of the present embodiment will he described below.

4.2) Operation

In the first prover 1001, the second random number generator 1002 generates random numbers s[1]∈Z/qZ. The first commitment section 1003 uses the random number s[1] to compute the first commitments v[1] and v[2]:

$$v[1]=\alpha^{s[1]} \bmod p; \text{ and}$$

$$v[2]=\beta^{s[1]} \bmod p.$$

The first automatic challenge section 1004 produces first automatic challenge c[1] using the first commitments v[1] and v[2]:

$$c[1] (\in Z/qZ) = \text{Hash}(p, q, g, h, \alpha, \beta, \alpha', \beta', \gamma', v[1], v[2]).$$

The first response section 1005 computes a first response t[1]:

$$t[1]=s[1]+rc[1] \bmod q,$$

where r is a random number generated by the random number generator 701.

The first proven text sending section 1006 produces a proven text (c[1], t[1]) and send it to the first verifier 1051.

In the first verifier 1051, the second decision section 1053 decides whether:

$$c[1]=\text{Hash}(p, q, g, h, \alpha, \beta, \alpha', \beta', \gamma', \alpha^{t[1]}/\alpha'^c \bmod p, \beta^{t[1]}/\beta'^c \bmod p).$$

If the equality is verified, then the verification acceptance is determined.

5. Fifth Embodiment 5.1) System Configuration

Figure 11:
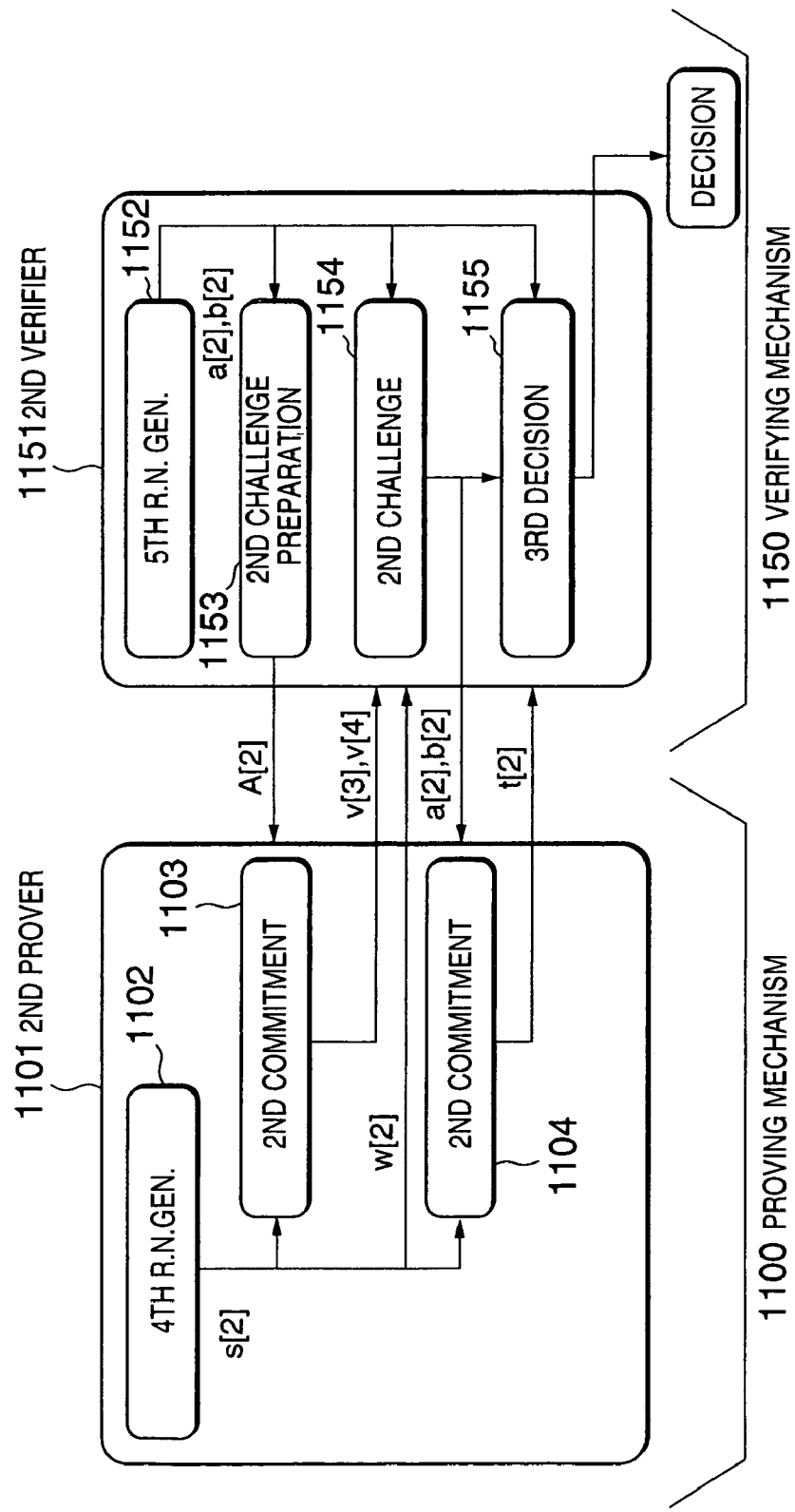
FIG. 11 is a block diagram showing second prover and second verifier in a zero-knowledge proving system according to a fifth embodiment of the present invention.

Referring to FIG. 11, the system according to the fifth embodiment includes a proving mechanism 1100 and a verifying mechanism 1150, in which a second prover 1101 and a second verifier 1151 are different from those of the first embodiment as shown in FIG. 7. Therefore, FIG. 11 shows only the second prover 1101 and the second verifier 1151, and other functional blocks are the same as shown in FIG. 7.

The second prover 1101 includes a fourth random number generator 1102, a second commitment section 1103, and a second response section 1104. The second verifier 1151 includes a fifth random number generator 1152, a second challenge preparation section 1153, a second challenge section 1154 and a third decision section 1155. As in the case of the first embodiment, the second prover 1101 and a second verifier 151 may be implemented by running corresponding programs on a computer.

The second prover 1101 and the second verifier 1151 communicate with each other such that second challenge preparation A[2] is sent from the second verifier 1151 to the second prover 1101, second commitments v[3] and v[4] and random number w[2] are sent from the second prover 1101 to the second verifier 1151, second challenges a[2] and b[2] are sent from the second verifier 1151 to the second prover 1101, and a second response L[2] is sent from the second prover 1101 to the second verifier 1151. The second verifier 1151 determines whether the second response t[2] is consistent with the second commitments v[3] and v[4], the random number w[2] and the second challenges a[2] and b[2]. More detailed operation of the present embodiment will he described below.

5.2) Operation

In the first verifier 1151, the fifth random number generator 1152 generates random numbers a[2], b[2]∈Z/qZ.

The second challenge preparation section 1153 uses the random numbers a[2], b[2] to compute second challenge preparation A[2]:

$$A[2]=g^{a[2]}\alpha^{b[2]} \bmod p.$$

The second challenge preparation A[2] is sent to the second prover 1101.

In the second prover 1101, the fourth random number generator 1102 generates random numbers $s[2] \in Z/qZ$ and $w[2] \in Z/qZ$. The second commitment section 1103 uses the random number s[2] to compute the second commitments v[3] and v[4]:

$$v[3]=g^{s[2]} \bmod p; \text{ and}$$

$$v[4]=h^{s[2]} \bmod p.$$

After having received the second challenge preparation A[2] from the second verifier 1151, the second commitment section 1103 sends the second commitments v[3] and v[4] and the random number w[2] to the second verifier 1151.

In the second verifier 1151, when having received the second commitments v[3] and v[4] and the random number w[2], the second challenge section 1154 sends the random numbers a[2], b[2] as the second challenge to the second prover 1101.

When having received the second challenges a[2], b[2], the second response section 1104 computes $g^{a[2]}\alpha^{b[2]} \bmod p$ and proves:

$$A[2]=g^{a[2]}\alpha^{b[2]} \bmod p.$$

If the equality of A[2] and $g^{a[2]}\alpha^{b[2]} \bmod p$ is not proved, then the proof is terminated.

When the equality of A[2] and $g^{a[2]}\alpha^{b[2]} \bmod p$ is proved, the second response section 1104 computes a second response t[2]:

$$t[2]=s[2]+xr(a[2]+w[2]) \bmod q,$$

where x is the private information stored in the private information memory 703 and r is a random number generated by the random number generator 701. The second response t[2] is sent to the second verifier 1151.

In the second verifier 1151, the third decision section 1155 decides whether $$v[3]\alpha'^{\{a[2]+w[2]\}}=g^{t[2]} \bmod p; \text{ and}$$

$$v[4]\gamma'^{\{a[2]+w[2]\}}=h^{t[2]} \bmod p.$$

If the equality is verified, then the verification acceptance is determined.

6. Sixth Embodiment 6.1) System Configuration

Figure 12:
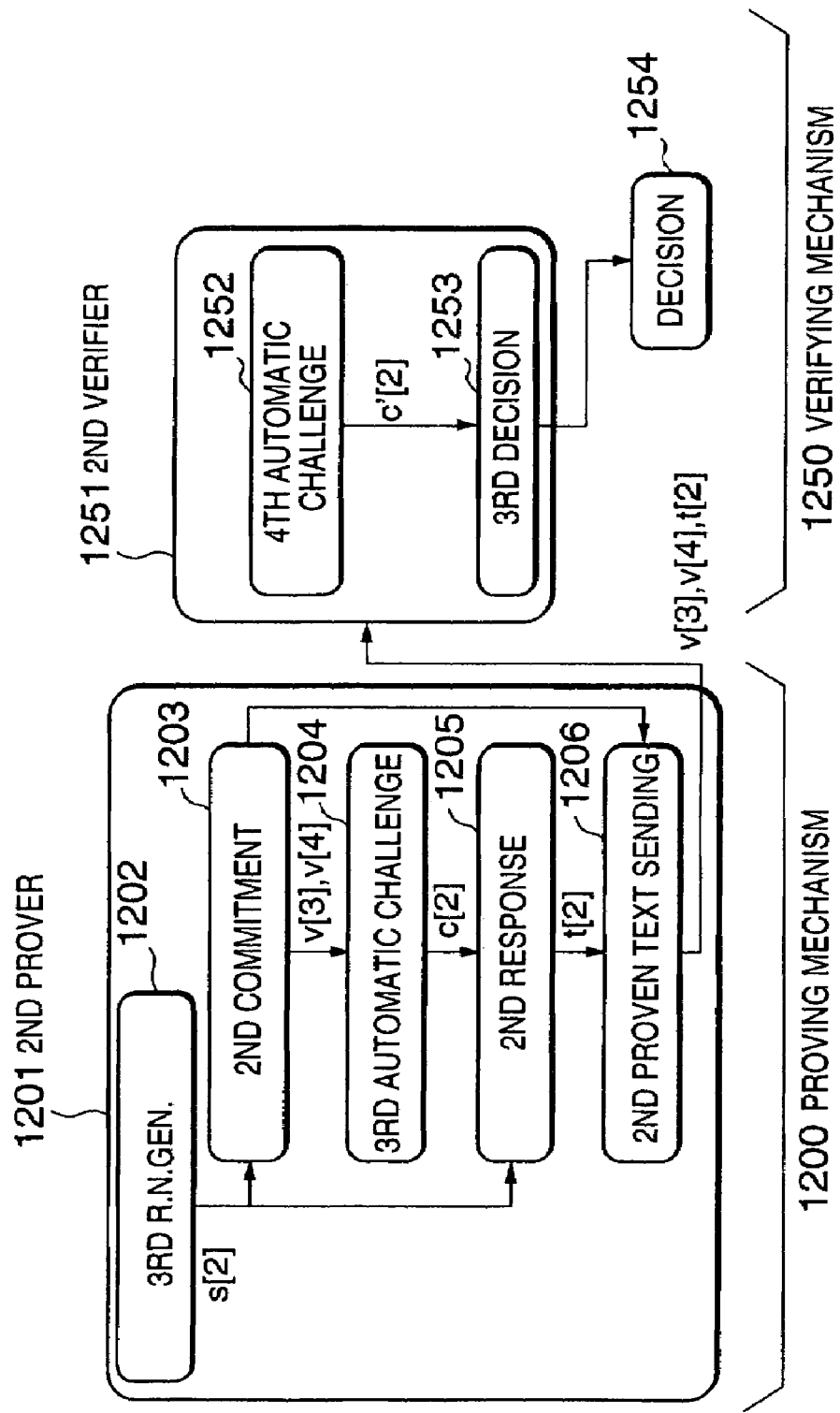
FIG. 12 is a block diagram showing second prover and second verifier in a zero-knowledge proving system according to a sixth embodiment of the present invention.

Referring to FIG. 12, the system according to the sixth embodiment includes a proving mechanism 1200 and a verifying mechanism 1250, in which a second prover 1201 and a second verifier 1251 are different from those of the first embodiment as shown in FIG. 7. Therefore, FIG. 12 shows only the second prover 1201 and the second verifier 1251, and other functional blocks are the same as shown in FIG. 7.

The second prover 1201 includes a third random number generator 1202, a second commitment section 1203, a second automatic challenge section 1204, a second response section 1205, and a second proven text sending section 1206. The second verifier 1251 includes a second automatic challenge section 1252 and a third decision section 1253.

The second commitment section 1203 uses a random number s[2] to convert bases g and h to produce second commitments v[3] and v[4]. The second automatic challenge section 1204 produces second automatic challenge c[2] from the second commitments v[3] and v[4]. The second response section 1205 computes second response t[2] from the second automatic challenge c[2] using the private information x, the random number r and the random number s[2]. The second proven text sending section 1206 sends the second commitments v[3] and v[4] and the second response t[2] as a second proven text to the second verifier 1251.

In the second verifier 1251, the second automatic challenge section 1252 produces second automatic challenge c'[2] from the second commitments v[3] and v[4]. The third decision section 1253 determines whether the second response t[2] is consistent with the second commitments v[3] and v[4] and the second automatic challenge c'[2].

As in the case of the first embodiment, the second prover 1201 and the second verifier 1251 may be implemented by running corresponding programs on a computer. More detailed operation of the present embodiment will be described below.

6.2) Operation

In the second prover 1201, the third random number generator 1202 generates random numbers $s[2] \in Z/qZ$. The second commitment section 1203 uses the random number s[2] to compute the second commitments v[3] and v[4]:

$$v[4]=h^{s[2]} \bmod p.$$

The second automatic challenge section 1204 produces second automatic challenge c[2] using the second commitments v[3] and v[4]:

$$c[2] \ (\in Z/qZ)=\text{Hash}(p, q, g, h, \alpha, \beta, \alpha', \beta', \gamma', v[3], v[4]).$$

The second response section 1205 computes a second response t[2]:

$$t[2]=s[2]+xrc[2] \bmod q,$$

where x is the private information and r is a random number generated by the random number generator 701.

The second proven text sending section 1206 produces a proven text (v[3], v[4], t[2]) and send it to the second verifier 1251.

In the second verifier 1251, the second automatic challenge section 1252 produces second automatic challenge c'[2]:

$$c'[2] \ (\in Z/qZ)=\text{Hash}(p, q, g, h, \alpha, \beta, \alpha', \beta', \gamma', v[3], v[4]).$$

Thereafter, the third decision section 1253 decides whether $$v[3]\alpha'^{c'[2]}=g^{t[2]} \bmod p; \text{ and}$$

$$v[4]\gamma'^{c'[2]}=h^{t[2]} \bmod p.$$

If the equality is verified, then the verification acceptance is determined.

7. Seventh Embodiment 7.1) System Configuration

Figure 13:
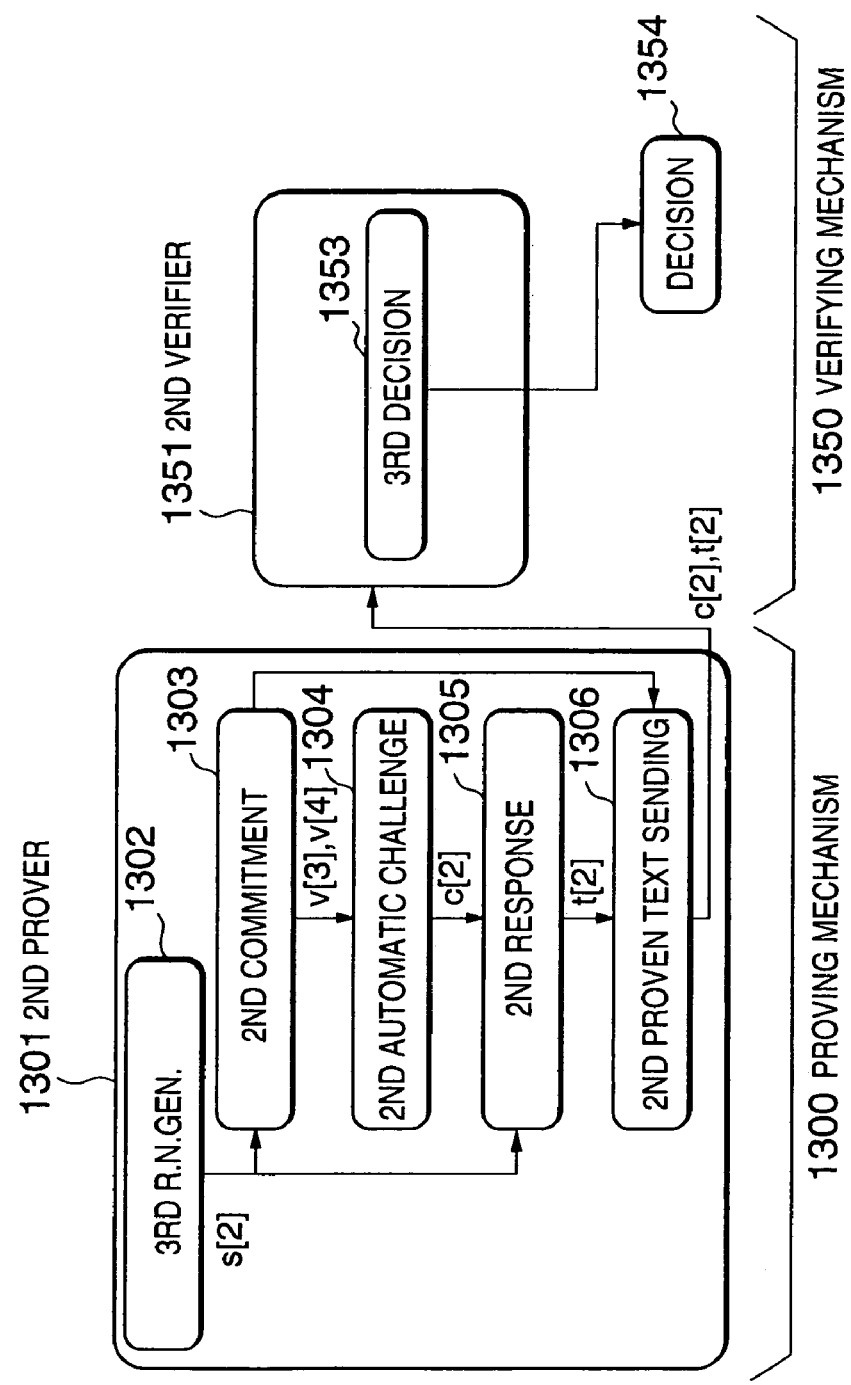
FIG. 13 is a block diagram showing second prover and second verifier in a zero-knowledge proving system according to a seventh embodiment of the present invention.

Referring to FIG. 13, the system according to the seventh embodiment includes a proving mechanism 1300 and a verifying mechanism 1350, in which a second prover 1301 and a second verifier 1351 are different from those of the first embodiment as shown in FIG. 7. Therefore, FIG. 13 shows only the second prover 1301 and the second verifier 1351, and other functional blocks are the same as shown an FIG. 7.

The second prover 1301 includes a third random number generator 1302, a second commitment section 1303, a second automatic challenge section 1304, a second response section 1305, and a second proven text sending section 1306. The second verifier 1351 includes a third decision section 1353.

The second commitment section 1303 uses a random number s[2] to convert bases g and h to produce second commitments v[3] and v[4]. The second automatic challenge section 1304 produces second automatic challenge c[2] from the second commitments v[3] and v[4]. The second response section 1305 computes second response t[2] from the second automatic challenge c[2] using the private information x, the random number r and the random number s[2]. The second proven text sending section 1306 sends the second automatic challenge c[2] and the second response t[2] as a second proven text to the second verifier 1351.

In the second verifier 1351, the third decision section 1353 determines whether the second response t[2] is consistent with the second automatic challenge c[2].

As in the case of the first embodiment, the second prover 1301 and the second verifier 1351 may be implemented by running corresponding programs on a computer. More detailed operation of the present embodiment will be described below.

7.2) Operation

In the second prover 1301, the third random number generator 1302 generates random numbers $s[2] \in Z/qZ$. The second commitment section 1303 uses the random number s[2] to compute the second commitments v[3] and v[4]:

$v[3] = g^{s[2]} \bmod p$; and $v[4] = h^{s[2]} \bmod p$.

The second automatic challenge section 1304 produces second automatic challenge c[2] using the second commitment v[3] and v[4]:

$c[2] \; (\in Z/qZ) = \text{Hash}(p, q, g, h, \alpha, \beta, \alpha', \beta', \gamma', v[3], v[4])$.

The second response section 1305 computes a second response t[2]:

$t[2] = s[2] + xrc[2] \bmod q$, where x is the private information and r is a random number generated by the random number generator 701.

The second proven text sending section 1306 produces a proven text (c[2], t[2]) and send it to the second verifier 1351.

In the second verifier 1351, the third decision section 1353 decides whether:

$c[2] = \text{Hash}(p, q, \alpha, \beta, \alpha', \beta', \gamma', g^{t[2]}/\alpha^{rc[2]} \bmod p, h^{t[2]}/\gamma'^{c[2]} \bmod p)$.

If the equality is verified, then the verification acceptance is determined.

8. Eighth Embodiment
    8.1) System Configuration
    Referring to FIG. 14, the system according to the eighth embodiment has a proving mechanism 1400 and a verifying mechanism 1450. The proving mechanism 1400 includes a random number generator 1401, a public information memory 1402, a private information memory 1403, a variable converter 1404, a prover 1405. The prover 1405 includes a second random number generator 1406, a commitment section 1407, and a response section 1408. The random number generator 1401, the variable converter 1404 and the prover 1405 may be implemented by running corresponding programs on a computer.

The verifying mechanism 1450 includes a public information memory 1451, a first verifier 1452, a second verifier 1458, and a decision section 1459. The first verifier 1452 includes a challenge section 1453 and a second decision section 1454. The first verifier 1452, the second verifier 1458, and the decision section 1459 may be implemented by running corresponding programs on a computer.

The prover 1405 and the first verifier 1452 communicate with each other such that commitments v[1], v[2], v[3], v[4] is sent from the prover 1405 to the first verifier 1452, a challenge c is sent from the first verifier 1452 back to the prover 1405, and responses t[1], t[2] is sent from the prover 1405 to the first verifier 1452. The first verifier 1452 determines whether the responses t[1], t[2] is consistent with the commitments v[1], v[2], v[3], v[4] and the challenge c.

8.2) Operation

An operation of the present embodiment will be described in detail.

The random number generator 1401 generates a random number $R \in Z/qZ$.

The public information memory 1402 stores p, q, g, h, $\alpha$ and $\beta$. The same public information are stored in a public information memory 1451 of the verifying mechanism 1450.

The private information memory 1403 stores private information x satisfying $\alpha = g^x \bmod p$, which is the discrete logarithm of $\alpha$ to the base g, that is, $x = \log_g \alpha$.

The random number generator 1401, the public information memory 1402 and the private information memory 1403 output p, q, g, h, $\alpha$, $\beta$, x, and r to the variable converter 1404. The variables p, q, g, h, $\alpha$ and $\beta$ are also referred by the prover 1405, the first verifier 1452 and the second verifier 1458.

The variable converter 1404 uses these variables to produce $\alpha'$, $\beta'$, $\gamma$ as follows:

$\alpha' = \alpha^r$;

$\beta' = \beta^r$; and $\gamma' = h^{xr}$.

The proving mechanism 1400 sends these $\alpha'$, $\beta'$ and $\gamma'$ to the verifying mechanism 1450. These $\alpha'$, $\beta'$ and $\gamma'$ are also referred by the prover 1405, the first and second verifiers 1452 and 1458.

8.3) Prover and First Verifier

In the prover 1405, the second random number generator 1406 generates a random numbers $s[1], s[2] \in Z/qZ$. The commitment section 1407 uses the random numbers s[1], s[2] to compute the commitments v[1], v[2], v[3], v[4]:

$v[1] = \alpha^{s[1]} \bmod p$;

$v[2] = \beta^{s[1]} \bmod p$;

$v[3] = g^{s[2]} \bmod p$; and $v[4] = h^{s[2]} \bmod p$.

The commitment section 1407 sends the commitments v[1], v,[2], v[3], v[4] to the first verifier 1452 of the verifying mechanism 1450.

In the first verifier 1452, after having received the commitment, the challenge section 1453 randomly generates a challenge c∈Z/qZ and sends it back to the prover 1405 of the proving mechanism 1400.

When having received the challenge c, the response section 1408 of the prover 1405 computes responses t[1], t[2]:

$t[1]=s[1]+rc \bmod q$; and $t[2]=s[2]+xrc \bmod q$.

The computed responses t[1], t[2] is sent to the first verifier 1452 of the verifying mechanism 1450.

In the first verifier 1452, the second decision section 1454 decides whether $v[1]\alpha'^c=\alpha'^{t[1]} \bmod p$;

$v[2]\beta'^c=\beta'^{t[1]} \bmod p$;

$v[3]\alpha'^c=g^{t[2]} \bmod p$; and $v[4]\gamma'^c=h^{t[2]} \bmod p$.

If the equality is verified, then the verification acceptance is determined.

8.4) Decision

The second verifier 1458 verifies about the equality of β' and γ' and, if it is verified that β'=γ', then the verification acceptance is determined.

The decision section 1459 outputs "OK" when the verification results of the first and second verifiers 1454 and 1458 are all verification acceptances. Otherwise the decision section 1459 outputs "NG".

α', β' and γ' may be sent to the verifying mechanism 750 at the same time when the commitments v[1], v[2], v[3], v[4] are sent to the verifying mechanism 1450.

The present embodiment provides a zero-knowledge proving scheme for proving the equality of the discrete logarithms. However, the third verifier 758 may verify about the inequality of β' and γ' and, if it is verified that β'≠γ', then the verification acceptance is determined. In this case, the present embodiment also provides a zero-knowledge proving scheme for proving the inequality of the discrete logarithms.

9. Ninth Embodiment 9.1) System Configuration

Figure 14:
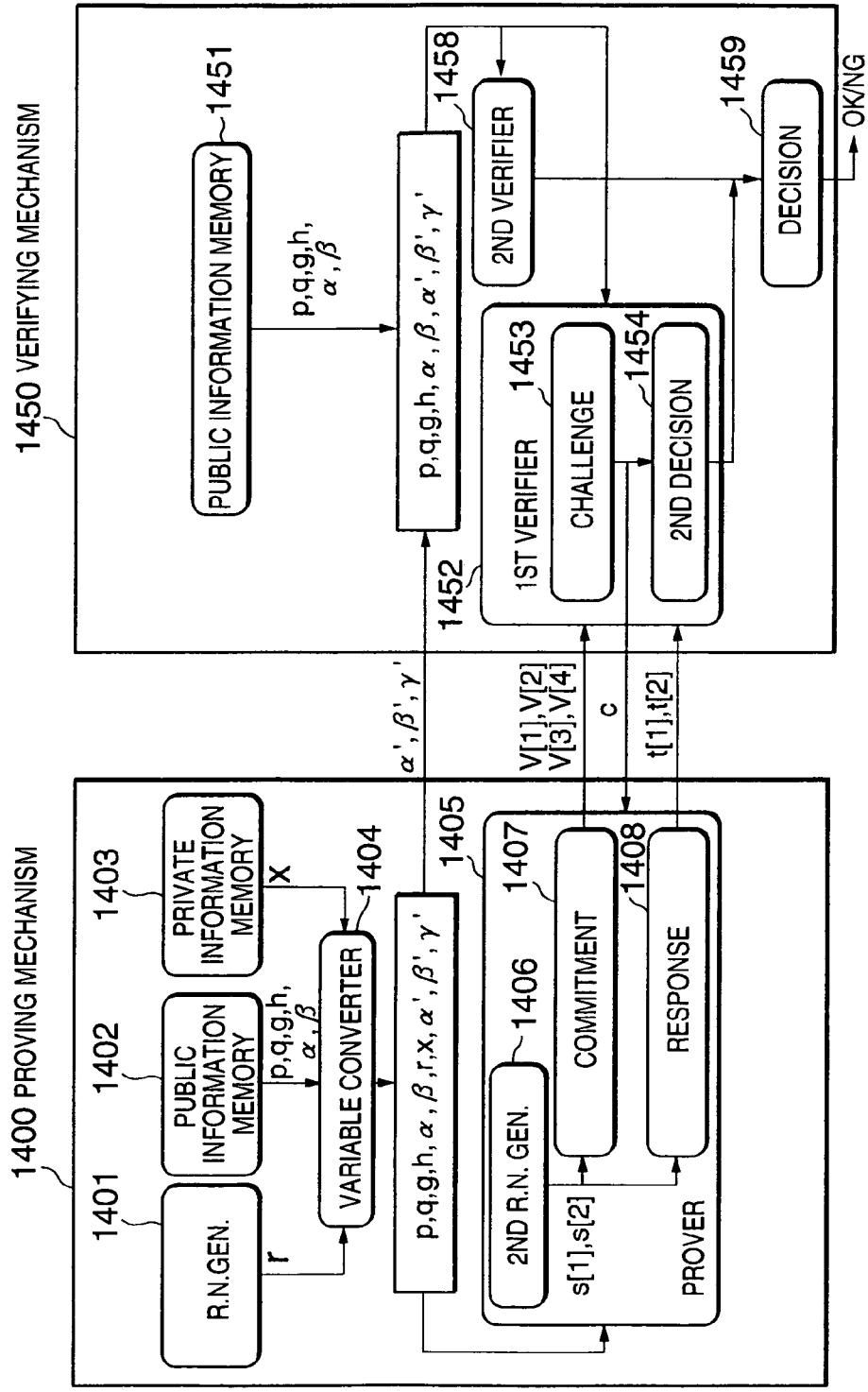
FIG. 14 is a block diagram showing a zero-knowledge proving system according to an eighth embodiment of the present invention.
Figure 15:
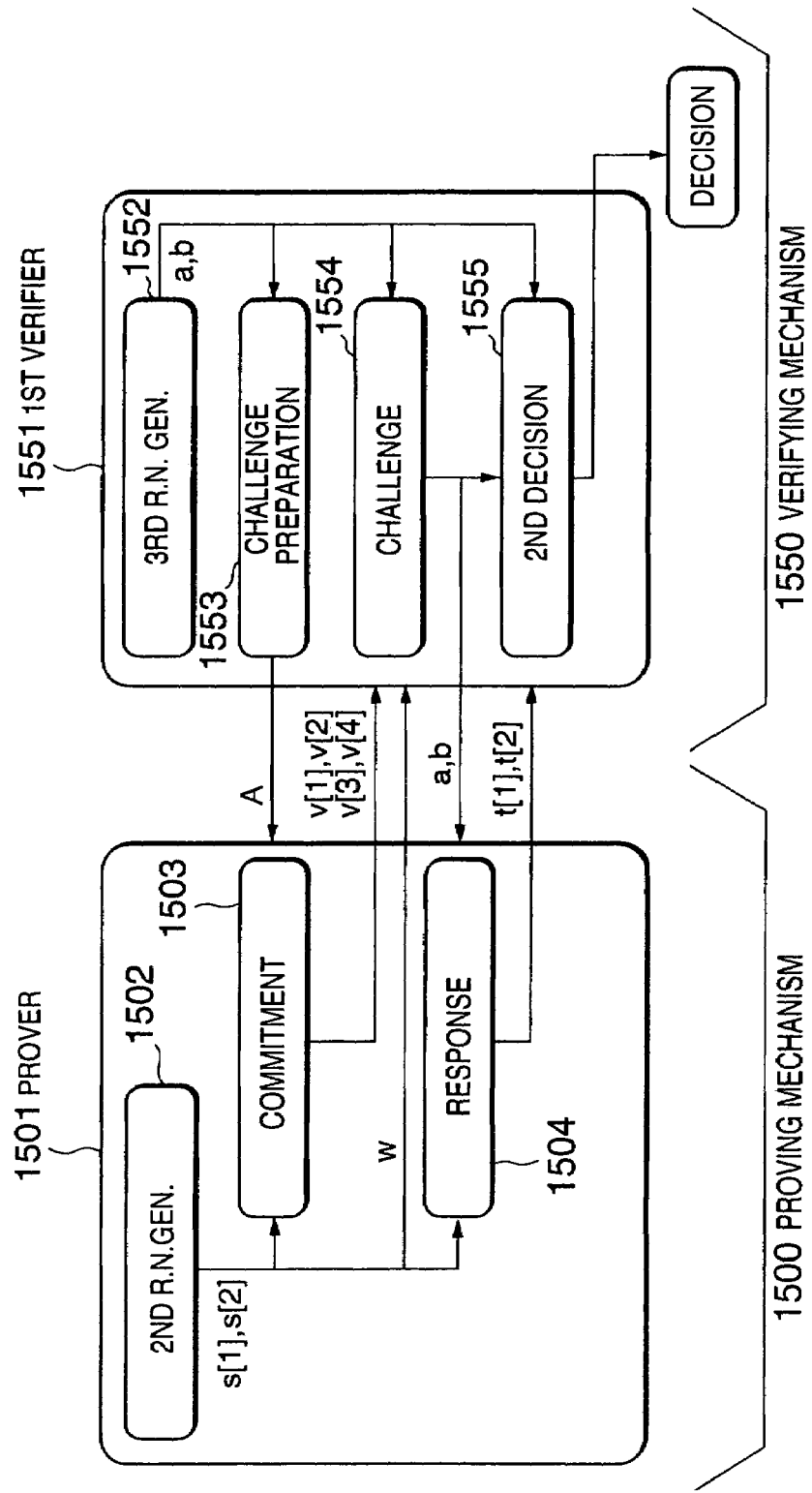
FIG. 15 is a block diagram showing a prover and a first verifier in a zero-knowledge proving system according to a ninth embodiment of the present invention.

Referring to FIG. 15, the system according to the ninth embodiment includes a proving mechanism 1500 and a verifying mechanism 1550, in which a first prover 1501 and a first verifier 1551 are different from those of the eighth embodiment as shown in FIG. 14. Therefore, FIG. 15 shows only the first prover 1501 and the first verifier 1551, and other functional blocks are the same as shown in FIG. 14.

The first prover 1501 includes a second random number generator 1502, a commitment section 1503, and a response section 1504. The first verifier 1551 includes a challenge preparation section 1553, a challenge section 1554 and a second decision section 1555. As in the case of the eighth embodiment, the first prover 1501 and the first verifier 1551 may be implemented by running corresponding programs on a computer.

The first prover 801 and the first verifier 851 communicate with each other such that challenge preparation A is sent from the first verifier 1551 to the first prover 1501, commitments v[1], v[2], v[3], v[4] and random number w are sent from the first prover 1501 to the first verifier 1551, challenge a and b are sent from the first verifier 1551 back to the first prover 1501, and responses t[1], t[2] is sent from the first prover 1501 to the first verifier 1551. The first verifier 1551 determines whether the responses t[1], t[2] is consistent with the commitments v[1], v[2], v[3], v[4], the random number w and the challenge a and b. More detailed operation of the present embodiment will be described below.

9.2) Operation

In the first verifier 1551, the third random number generator 1552 generates random numbers a, b∈Z/qZ.

The challenge preparation section 1553 uses the random numbers a, b to compute challenge preparation A:

$A=g^a\alpha^b \bmod p$.

The challenge preparation A is sent to the first prover 1501.

In the first prover 1501, the second random number generator 1502 generates random numbers s[1], s[2]∈Z/qZ and w∈Z/qZ. The commitment section 1503 uses the random numbers s[1], s[2] to compute commitments v[1], v[2], v[3], v[4]:

$v[1]=\alpha^{s[1]} \bmod p$;

$v[2]=\beta^{s[1]} \bmod p$;

$v[3]=g^{s[2]} \bmod p$; and $v[4]=h^{s[2]} \bmod p$.

After having received the challenge preparation A from the first verifier 1551, the commitment section 1503 sends the commitments v[1], v[2], v[3], v[4] and the random number w to the first verifier 1551.

In the first verifier 1551, when having received the commitments v[1], v[2], v[3], v[4] and the random number w, the challenge section 1554 sends the random numbers a, b as the challenge to the first prover 1501.

When having received the challenges a, b, the response section 1504 computes $g^a\alpha^b \bmod p$ and proves:

$A=g^a\alpha^b \bmod p$.

If the equality of A and $g^a\alpha^b \bmod p$ is not proved, then the proof is terminated.

When the equality of A and $g^a\alpha^b \bmod p$ is proved, the response section 1504 computes response t[1], t[2]:

$t[1]=s[1]+r(a+w)\bmod q$; and $t[2]=s[2]+xr(a+w)\bmod q$, where r is a random number generated by the random number generator 1401 and x is the private information. The responses t[1], t[2] is sent to the first verifier 1551.

In the first verifier 1551, the second decision section 1555 decides whether $v[1]\alpha'^{\{a+w\}}=\alpha'^{t[1]} \bmod p$;

$v[2]\beta'^{\{a+w\}}=\beta'^{t[1]} \bmod p$;

$v[3]\alpha'^{\{a+w\}}=g^{t[2]} \bmod p$; and $v[4]\gamma'^{\{a+w\}}=h^{t[2]} \bmod p$.

If the equality is verified, then the verification acceptance is determined.

10. Tenth Embodiment

10.1) System Configuration

Figure 16:
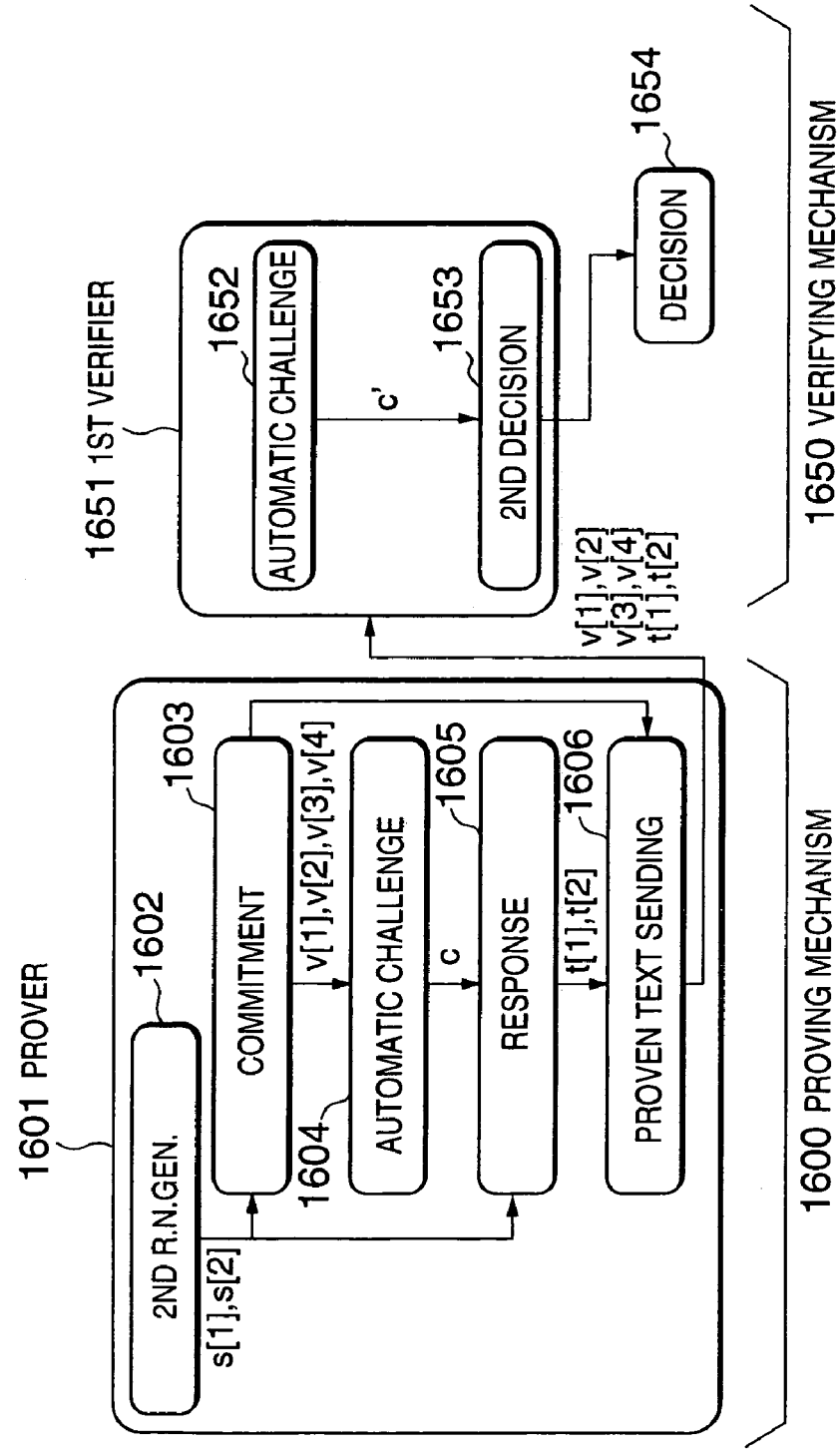
FIG. 16 is a block diagram showing a prover and a first verifier in a zero-knowledge proving system according to a tenth embodiment of the present invention.

Referring to FIG. 16, the system according to the tenth embodiment includes a proving mechanism 1600 and a verifying mechanism 1650, in which a prover 1601 and a first verifier 1651 are different from those of the eighth embodiment as shown in FIG. 14. Therefore, FIG. 16 shows only the prover 1601 and the first verifier 1651, and other functional blocks are the same as shown in FIG. 14.

The prover 1601 includes a second random number generator 1602, a commitment section 1603, an automatic challenge section 1604, a response section 1605, and a proven text sending section 1606. The first verifier 1651 includes an automatic challenge section 1652 and a second decision section 1653.

The commitment section 1603 uses random numbers s[1], s[2] to convert $\alpha$, $\beta$, g and h to produce commitments v[1], v[2], v[3], v[4]. The automatic challenge section 1604 produces automatic challenge c from the commitments v[1], v[2], v[3], v[4]. The response section 1605 computes responses t[1], t[2] from the automatic challenge c using the private information x, the random number r and the random numbers s[1], s[2]. The proven text sending section 1606 sends the commitments v[1], v[2], v[3], v[4] and the responses t[1], t[2] as a proven text to the first verifier 1651.

In the first verifier 1651, the automatic challenge section 1652 produces automatic challenge c' from the commitments v[1], v[2], v[3], v[4]. The second decision section 1653 determines whether the response t[1], t[2] is consistent with the commitments v[1], v[2], v[3], v[4] and the automatic challenge c'.

As in the case of the eighth embodiment, the prover 1601 and the first verifier 1651 may be implemented by running corresponding programs on a computer. More detailed operation of the present embodiment will be described below.

10.2) Operation

In the prover 1601, the second random number generator 1602 generates random numbers s[1], s[2]$\in$Z/qZ. The commitment section 1603 uses the random numbers s[1], s[2] to compute the commitments v[1], v[2], v[3], v[4]:

$$v[1]=\alpha^{s[1]} \bmod p;$$

$$v[2]=\beta^{s[1]} \bmod p;$$

$$v[3]=g^{s[2]} \bmod p; \text{ and}$$

$$v[4]=h^{s[2]} \bmod p.$$

The automatic challenge section 1604 produces the automatic challenge c using the commitments v[1], v[2], v[3], v[4]:

$$c(\in Z/qZ)=\text{Hash}(p, q, g, h, \alpha, \beta, \alpha', \beta', \gamma', v[1], v[2], v[3], v[4]).$$

The response section 1605 computes the response t[1], t[2]:

$$t[1]=s[1]+rc \bmod q; \text{ and}$$

$$t[2]=s[2]+xrc \bmod q,$$

where x is the private information and r is a random number generated by the random number generator 1401.

The proven text sending section 1606 produces a proven text (v[1], v[2], v[3], v[4], t[1], t[2]) and send it to the first verifier 1651.

In the first verifier 1651, the automatic challenge section 1652 produces automatic challenge c':

$$c'(\in Z/qZ)=\text{Hash}(p, q, g, h, \alpha, \beta, \alpha', \beta', \gamma', v[1], v[2], v[3], v[4]).$$

Thereafter, the second decision section 1653 decides whether $$v[1]\alpha'^{c'}=\alpha^{t[1]} \bmod p;$$

$$v[2]\beta'^{c'}=\beta^{t[1]} \bmod p;$$

$$v[3]\alpha'^{c'}=g^{t[2]} \bmod p; \text{ and}$$

$$v[4]\gamma'^{c'}=h^{t[2]} \bmod p.$$

If the equality is verified, then the verification acceptance is determined.

11. Eleventh Embodiment

11.1) System Configuration

Figure 17:
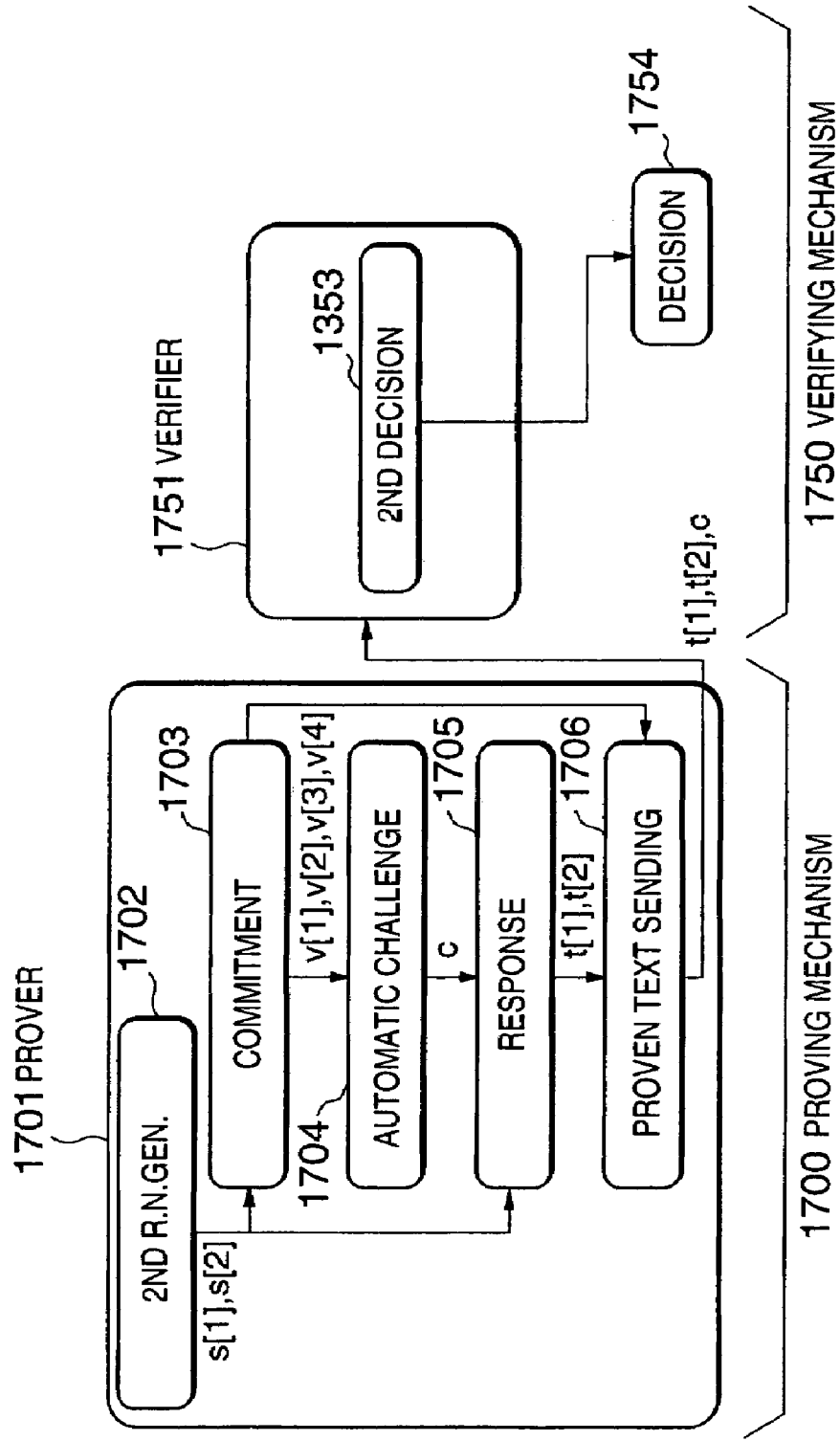
FIG. 17 is a block diagram showing a prover and a first verifier in a zero-knowledge proving system according to an eleventh embodiment of the present invention.

Referring to FIG. 17, the system according to the eleventh embodiment includes a proving mechanism 1700 and a verifying mechanism 1750, in which a prover 1701 and a first verifier 1751 are different from those of the eighth embodiment as shown in FIG. 14. Therefore, FIG. 17 shows only the prover 1701 and the first verifier 1751, and other functional blocks are the same as shown in FIG. 14.

The prover 1701 includes a second random number generator 1702, a commitment section 1703, an automatic challenge section 1704, a response section 1705, and a proven text sending section 1706. The first verifier 1751 includes a second decision section 1753.

The commitment section 1703 uses random numbers s[1], s[2] to convert $\alpha$, $\beta$, q and h to produce commitments v[1], v[2] v[3], v[4]. The automatic challenge section 1704 produces automatic challenge c from the commitments v[1], v[2], v[3], v[4]. The response section 1705 computes responses t[1], t[2] from the automatic challenge c using the private information x, the random number r and the random numbers s[1], s[2]. The proven text sending section 1706 sends the automatic challenge c and the responses t[1], t[2] as a proven text to the first verifier 1751.

In the first verifier 1751, the second decision section 1753 determines whether the response t[1], t[2] is consistent with the automatic challenge c.

As in the case of the eighth embodiment, the prover 1701 and the first verifier 1751 may be implemented by running corresponding programs on a computer. More detailed operation of the present embodiment will be described below.

11.2) Operation

In the prover 1701, the second random number generator 1702 generates random numbers s[1], s[2]$\in$Z/qZ. The commitment section 1703 uses the random numbers s[1], s[2] to compute the commitments v[1], v[2], v[3], v[4]:

$$v[1]=\alpha^{s[1]} \bmod p;$$

$$v[2]=\beta^{s[1]} \bmod p;$$

$$v[3]=g^{s[2]} \bmod p; \text{ and}$$

$$v[4]=h^{s[2]} \bmod p.$$

The automatic challenge section 1704 produces the automatic challenge c using the commitments v[1], v[2], v[3], v[4]:

$$c(\in Z/qZ)=\text{Hash}(p, q, g, h, \alpha, \beta, \alpha', \beta', \gamma', v[1], v[2], v[3], v[4]).$$

The response section 1705 computes the response t[1], t[2]:

$t[1]=s[1]+rc \bmod q$; and $t[2]=s[2]+xrc \bmod q$, where x is the private information and r is a random number generated by the random number generator 1401.

The proven text sending section 1706 produces a proven text (c, t[1], t[2]) and send it to the first verifier 1751.

In the first verifier 1751, the second decision section 1753 decides whether:

$c=\text{Hash}(p, q, g, h, \alpha, \beta, \alpha', \beta', \gamma', \alpha^{t[1]}/\alpha'^c \bmod p,$
$\beta^{t[1]}/\beta'^c \bmod p, g^{t[2]}/\alpha'^c \bmod p, h^{t[2]}/\gamma'^c \bmod p)$.

If the equality is verified, then the verification acceptance is determined.

12. Twelfth Embodiment

Figure 18:
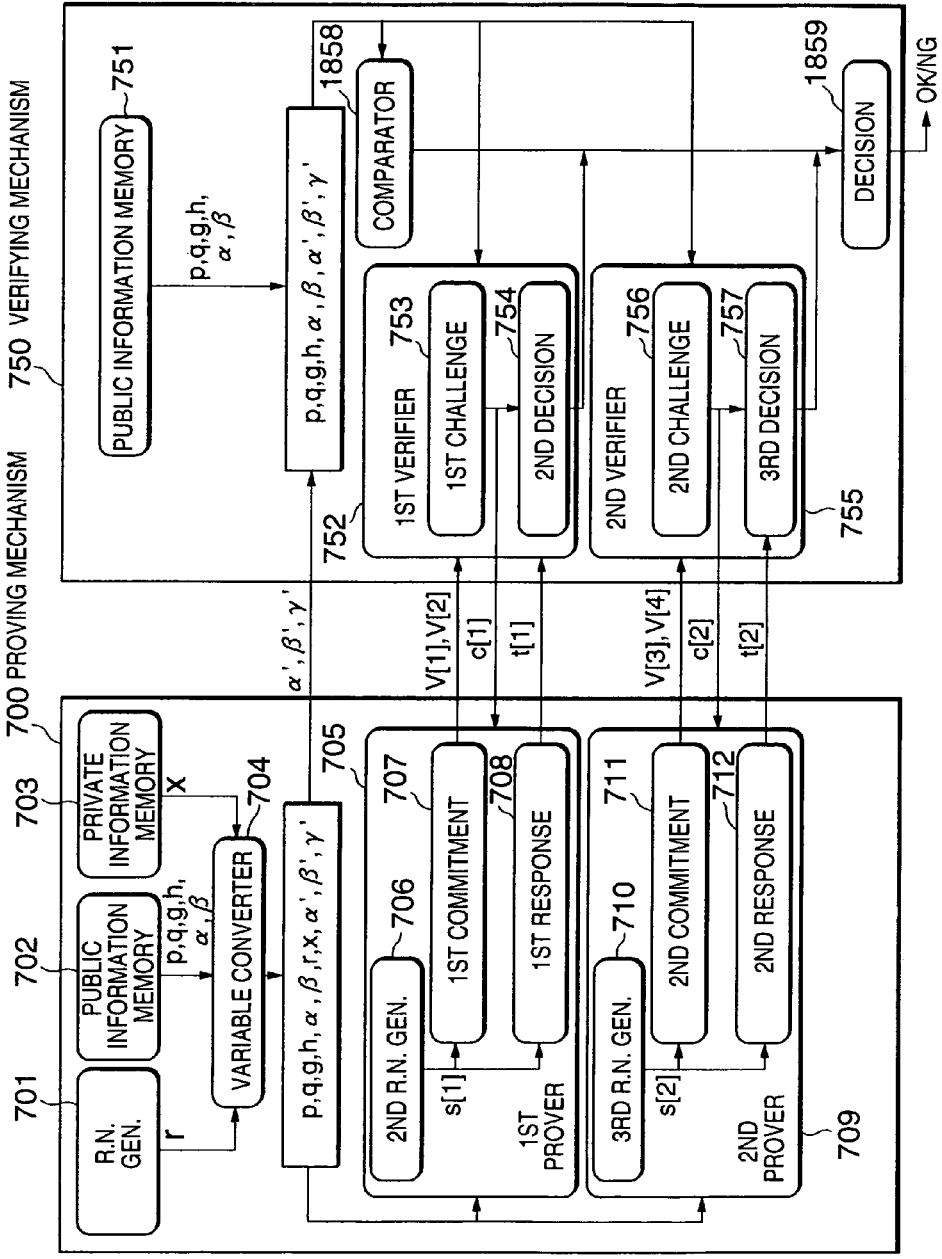
FIG. 18 is a block diagram showing a zero-knowledge proving system according to a twelfth embodiment of the present invention.

As shown in FIG. 18, a modification of the first embodiment as shown in FIG. 7 may be constructed as a twelfth embodiment. In the twelfth embodiment, the verifying mechanism 750 is provided with a comparator 1858 in place of the third verifier 758 and a decision section 1859 in place of the decision section 759, of the first embodiment as shown in FIG. 7.

The comparator 1858 compares β' and γ' to determine whether β'=γ'. The decision section 1859 decides the equality of the discrete logarithms when the verification results of the first and second verifiers 754 and 757 are verification acceptances and the comparator 1858 determine that β'=γ'. When the comparator 654 determine that β'≠γ', the decision section 1859 decides the inequality of the discrete logarithms.

13. Thirteenth Embodiment

Figure 19:
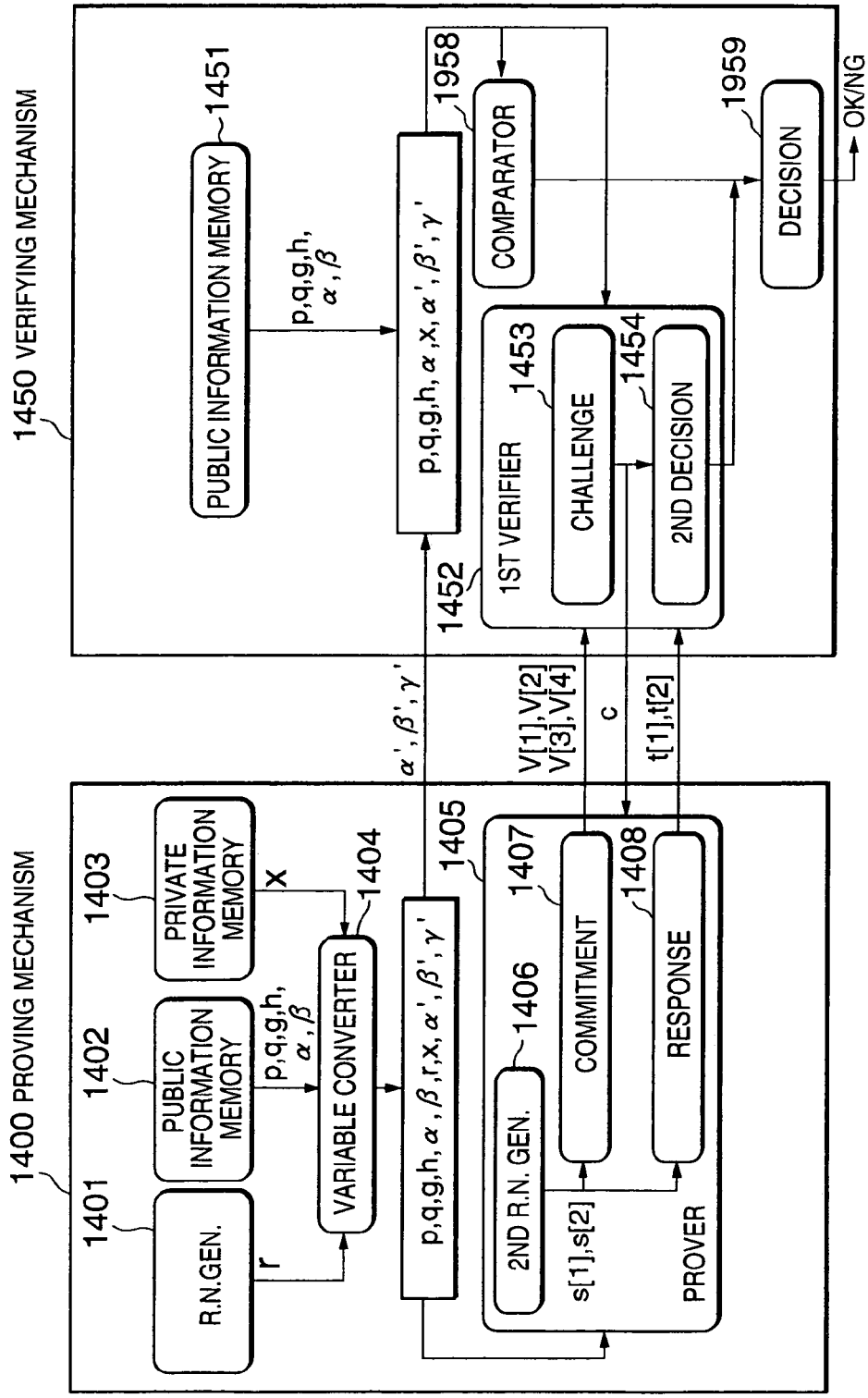
FIG. 19 is a block diagram showing a zero-knowledge proving system according to a thirteenth embodiment of the present invention.

As shown in FIG. 19, a modification of the eighth embodiment as shown in FIG. 14 may be constructed as a thirteenth embodiment. In the thirteenth embodiment, the verifying mechanism 1450 is provided with a comparator 1958 in place of the second verifier 1458 and a decision section 1959 in place of the decision section 1459, of the eighth embodiment as shown in FIG. 14. In other words, the thirteenth embodiment provides the zero-knowledge proving scheme for proving the equality or inequality of discrete logarithms.

The comparator 1958 compares β' and γ' to determine whether β'=γ'. The decision section 1959 decides the equality of the discrete logarithms when the verification result of the second verifier 1454 is verification acceptance and the comparator 1958 determine that β'=γ'. When the comparator 1958 determine that β'≠γ', the decision section 1959 decides the inequality of the discrete logarithms.

As described above, provided with g, h, α(=g^x)mod p∈G, and β∈G, where G is a group of order q on mod p, β≠h^x mod p or β−h^x mod p can be efficiently proved without indicating x and h^x mod p. In addition, a prover can prove it solely.

It should be noted that a combination of first prover and first verifier as described in the above second through fourth embodiments and a combination of second prover and second verifier as described in the above fifth through seventh embodiment, can be arbitrarily combined to form another embodiment of the present invention.

In the above embodiments, a proving mechanism and a verifying mechanism can be communicated through wired or wireless connection. In other words, the proving mechanism and verifying mechanism can be implemented in any devices having wired or wireless signal transmitting and receiving functions.

Although the invention has been described in its preferred embodiments, it is understood that modifications or variations will be apparent to those skilled in the art without departing from the spirit or scope of the invention.

The invention claimed is:

1. A system comprising a first mechanism for proving equality or inequality of two discrete logarithms and a second mechanism for verifying said equality or inequality, wherein
the first mechanism comprises:
a first public information memory storing a designated operation scheme, two input numbers (hereinafter, denoted by α and β), and two predetermined bases (hereinafter, denoted by g and h);
a private information memory storing private information (hereafter, denoted by x) which is a discrete logarithm of α to the base g;
a random number generator for generating a first random number (hereafter, denoted by r);
a converter for converting the input number α, the input number β and the base h to produce α', β' and γ' using the first random number r and the private information x as follows:

$\alpha'=\alpha^r$; and $\beta'=\beta^r$; and $\gamma'=h^{xr}$, wherein said α', β' and γ' are sent to the second mechanism; and
a proving section for proving equality of a discrete logarithm of α' to base α and a discrete logarithm of β' to base β and equality of a discrete logarithm of α' to the base g and a discrete logarithm of γ' to the base h, and
the second mechanism comprises:
a second public information memory storing the designated operation scheme, the two input numbers α and β, and the two predetermined bases g and h;
a verifying section corresponding to the proving section, for verifying equality of a discrete logarithm of the received α' to base α and a discrete logarithm of the received β' to base β, and equality of a discrete logarithm of the received α' to the base g and a discrete logarithm of the received γ' to the base h;
a checking section for checking the received β' and γ' to determine equality of inequality thereof; and
a decision section for deciding whether proof of the first mechanism is acceptable, depending on results of the verifying section and the checking section.

2. The system according to claim 1, wherein
the proving section comprises:
a first prover for proving the equality of the discrete logarithm of α' to base α and the discrete logarithm of β' to base β; and
a second prover for proving the equality of the discrete logarithm of α' to the base q and the discrete logarithm of γ' to the base h, and
the verifying section comprises:
a first verifier corresponding to the first prover, for verifying the equality of the discrete logarithm of the received α' to base α and the discrete logarithm of the received β' to base β; and a second verifier corresponding to the second prover, for verifying the equality of the discrete logarithm of the received α' to the base g and toe discrete logarithm of the received γ' to the base h.

3. The system according to claim 2, wherein the checking section comprises a third verifier for verifying the equality of the received β' and γ'.

4. The system according to claim 2, wherein the checking section comprises a third verifier for verifying the inequality of the received β' and γ'.

5. The system according to claim 2, wherein the checking section comprises a comparator for comparing the received β' and γ'.

6. The system according to claim 2, wherein
the first prover comprises:
a second random number generator for generating a second random number;
a first converter for converting the input number α, the input number β to produce first commitments corresponding to respective ones of said α and β using the second random number; and
a first response generator for generating a first response using the first random number r and the second random number, in response to a first challenge received from the first verifier, and
the first verifier comprises:
a first challenge generator for randomly generating the first challenge after having received the first commitments from the first prover; and
a second decision section for deciding whether the first response is consistent with the first commitments and the first challenge, wherein a result of the decision is informed to the decision section.

7. The system according to claim 2, wherein
the first prover comprises:
a second random number generator for generating a second random number and a third random number when having received a first challenge preparation from the first verifier;
a first converter for converting the input number α and the input number β to produce first commitments corresponding to respective ones of said α and β using the second random number, wherein the third random number and the first commitments are sent to the first verifier; and
a first response generator for generating a first response using the first random number r, the second random number, and the third random number in response to a first challenge received from the first verifier, when the first challenge preparation is valid, and
the first verifier comprises:
a third random number generator for generating a fourth random number;
a first challenge preparation generator for generating the first challenge preparation from the base g and the input number at using the fourth random number;
a first challenge generator for generating the first challenge using the fourth random number after having received the third random number and the first commitments from the first prover; and
a second decision section for deciding whether the first response is consistent with the first commitments and the first challenge, wherein a result of the decision is informed to the decision section.

8. The system according to claim 2, wherein
the first prover comprises:
a second random number generator for generating a second random number;
a first converter for converting the input number α, the input number β to produce first commitments corresponding to respective ones of said α and β using the second random number;
a first automatic challenge generator for generating a first automatic challenge from the first commitments;
a first response generator for generating a first response using the first random number r and the second random number, in response to the first automatic challenge; and
a first proven text generator for generating a first proven text composed of the first commitments and the first response, wherein the first proven text is sent to the first verifier, and
the first verifier comprises:
a second automatic challenge generator for generating a second automatic challenge after having received the first commitments from the first prover; and
a second decision section for deciding whether the first response is consistent with the first commitments and the second automatic challenge, wherein a result of the decision is informed to the decision section.

9. The system according to claim 2, wherein
the first prover comprises:
a second random number generator for generating a second random number;
a first converter for converting the input number α, the input number β to produce first commitments corresponding to respective ones of said α and β using the second random number;
a first automatic challenge generator for generating a first automatic challenge from the first commitments;
a first response generator for generating a first response using the first random number r and the second random number, in response to the first automatic challenge; and
a first proven text generator for generating a first proven text composed of the first automatic challenge and the first response, wherein the first proven text is sent to the first verifier, and
the first verifier comprises:
a second decision section for deciding whether the first automatic challenge and the first response included in the first proven text is consistent with each other, wherein a result of the decision is informed to the decision section.

10. The system according to claim 2, wherein
the second prover comprises:
a third random number generator for generating a third random number;
a second converter for converting the bases g and h to produce second commitments corresponding to respective ones of said g and h using the third random number; and
a second response generator for generating a second response using the first random number r and the third random number, in response to a second challenge received from the second verifier, and
the second verifier comprises:
a second challenge generator for randomly generating the second challenge after having received the second commitments from the second prover; and a third decision section or deciding whether the second response is consistent with the second commitments and the second challenge, wherein a result of the decision is informed to the decision section.

11. The system according to claim 2, wherein the second prover comprises:
a fourth random number generator for generating a fifth random number and a sixth random number when having received a second challenge preparation from the second verifier;
a second converter for converting the bases g and h to produce second commitments corresponding to respective ones of the bases g and h using the fifth random number, wherein the sixth random number and the second commitments are sent to the second verifier; and
a second response generator for generating a second response using the first random number, the fifth random number, and the sixth random number in response to a second challenge received from the second verifier, when the second challenge preparation is valid, and
the second verifier comprises:
a fifth random number generator for generating a seventh random number;
a second challenge preparation generator for generating the second challenge preparation from the bases g and the input number $\alpha$ using the seventh random number;
a second challenge generator for generating the second challenge using the seventh random number after having received the sixth random number and the second commitments from the second prover; and
a third decision section for deciding whether the second response is consistent with the second commitments and the second challenge, wherein a result of the decision is informed to the decision section.

12. The system according to claim 2, wherein the second prover comprises:
a third random number generator for generating a third random number;
a second converter for converting the bases g and h to produce second commitments corresponding to respective ones of the bases g and h using the third random number;
a third automatic challenge generator for generating a third automatic challenge from the second commitments;
a second response generator bar generating a second response using the first random number r and the third random number, in response to the third automatic challenge; and
a second proven text generator for generating a second proven text composed of the second commitments and the second response, wherein the second proven text is sent to the second verifier, and
the second verifier comprises:
a fourth automatic challenge generator for generating a fourth automatic challenge after having received the second commitments included in the second proven text from the second prover; and
a third decision section for deciding whether the second response is consistent with the second commitments and the fourth automatic challenge, wherein a result of the decision is informed to the decision section.

13. The system according to claim 2, wherein the second prover comprises:
a third random number generator for generating a third random number;

a second converter for converting the bases g and h to produce second commitments corresponding to respective ones of the bases g and h using the third random number;
a third automatic challenge generator for generating a third automatic challenge from the second commitments;
a second response generator for generating a second response using the first random number r and the third random number, in response to the third automatic challenge; and
a second proven text generator for generating a second proven text composed of the second automatic challenge and the second response, wherein the second proven text is sent to the second verifier, and
the second verifier comprises:
a third decision section for deciding whether the second automatic challenge and the second response included in the second proven text is consistent with each other, wherein a result of the decision is informed to the decision section.

14. The system according to claim 1, wherein the proving section comprises a single prover for proving the equality of the discrete logarithm of $\alpha'$ to base $\alpha$ and the discrete logarithm of $\beta'$ to base $\beta$, and the equality of the discrete logarithm of $\alpha'$ to the base g and the discrete logarithm of $\gamma'$ to the base h, and
the verifying section comprises a single verifier for verifying the equality of a discrete logarithm of the received $\alpha'$ to base $\alpha$ and a discrete logarithm of the received $\beta'$ to base $\beta$, and the equality of a discrete logarithm of the received $\alpha'$ to the base g and a discrete logarithm of the received $\gamma'$ to the base h.

15. The system according to claim 14, wherein the checking section comprises a verifier for verifying the equality of the received $\beta'$ and $\gamma'$.

16. The system according to claim 14, wherein the checking section comprises a verifier for verifying the inequality of the received $\beta'$ and $\gamma'$.

17. The system according to claim 14, wherein the checking section comprises a comparator for comparing the received $\beta'$ and $\gamma'$.

18. The system according to claim 14, wherein the single prover comprises:
a second random number generator for generating a second random number;
a commitment generator for converting the input number $\alpha$, the input number $\beta$, tho base g and the base h to produce commitments corresponding to respective ones of said $\alpha$, $\beta$, g, and h using the second random number; and
a response generator for generating a response using the first random number r and the second random number, in response to a challenge received from the single verifier, and
the single verifier comprises:
a challenge generator for generating the challenge after having received the commitments from the single prover; and
a second decision section for deciding whether the response is consistent with the commitments and the challenge, wherein a result of the decision is informed to the decision section.

19. The system according to claim 14, wherein
the single prover comprises:
a second random number generator for generating a second random number and a third random number when having received a challenge preparation from the single verifier;
a commitment generator for converting the input number α, the input number β, the base g and the base h to produce commitments corresponding to respective ones of said α, β, g, and h using the second random number, wherein the third random number and the commitments are sent to the single verifier; and
a response generator for generating a response using the first random number r, the second random number, and the third random number in response to a challenge received from the single verifier, when the challenge preparation is valid, and
the single verifier comprises:
a third random number generator for generating a fourth random number;
a challenge preparation generator for generating the challenge preparation from the base g and the input number α using the fourth random number;
a challenge generator for generating the challenge using the fourth random number after having received the third random number and the commitments from the single prover; and
a second decision section for deciding whether the response is consistent with the commitments and the challenge, wherein a result of the decision is informed to the decision section.

20. The system according to claim 14, wherein
the single prover comprises:
a second random number generator for generating a second random number;
a commitment generator for converting the input number α, the input number β, the base g and the base h to produce commitments corresponding to respective ones of said α, β, g, and h using the second random number;
a first automatic challenge generator for generating a first automatic challenge from the commitments;
a response generator for generating a response using the first random number r and the second random number, in response to the first automatic challenge; and
a proven text generator for generating a proven text composed of the commitments and the response, wherein the proven text is sent to the single verifier, and
the single verifier comprises:
a second automatic challenge generator for generating a second automatic challenge after having received the commitments from the single prover; and
a second decision section for deciding whether the response is consistent with the commitments and the second automatic challenge, wherein a result of the decision is informed to the decision section.

21. The system according to claim 14, wherein
the single prover comprises:
a second random number generator for generating a second random number;
a commitment generator for converting the input number α, the input number β, the base g and the base h to produce commitments corresponding to respective ones of said α, β, g, and h using the second random number;
an automatic challenge generator for generating an automatic challenge from the commitments;
a response generator for generating a response using the first random number r and the second random number, in response to the automatic challenge; and
a proven text generator for generating a proven text composed of the automatic challenge and the response, wherein the proven text is sent to the single verifier, and
the single verifier comprises:
a second decision section for deciding whether the response and the automatic challenge included in the proven text received from the single prover is consistent with each other, wherein a result of the decision is informed to the decision section.

22. A proving device for proving equality or inequality of two discrete logarithms, comprising:
a public information memory storing a designated operation scheme, two input numbers (hereinafter, denoted by α and β, and two predetermined bases (hereinafter, denoted by g and h);
a private information memory storing private information (hereafter, denoted by x) which is a discrete logarithm of α to the base g;
a random number generator for generating a first random number (hereafter, denoted by r);
a converter for converting the input number α, the input number β and the base h to produce α', β' and γ' using the first random number and the private information x as follows:

$\alpha' = \alpha^r$;

$\beta' = \beta^r$; and $\gamma' = h^{xr}$, wherein said α', β' and γ' are sent to the second mechanism; and
a proving section for proving equality of a discrete logarithm of α' to base α and a discrete logarithm of β' to base β and equality of a discrete logarithm of α' to the base g and a discrete logarithm of γ' to the base h.

23. A verifying device for verifying proof provided by a proving device for proving equality or inequality of two discrete logarithms, comprising:
a public information memory storing a designated operation scheme, two input numbers α and β, and two predetermined bases g and h;
a verifying section corresponding to the proving device, for verifying equality of a discrete logarithm of α' to base α and a discrete logarithm of β' to base β, and equality of a discrete logarithm of α' to the base g and a discrete logarithm of γ' to the base h, wherein said α', β' and γ' are received from the proving device;
a checking section for checking β' and γ' to determine equality or inequality thereof; and
a decision section for deciding whether proof of the first mechanism is acceptable, depending on results of the verifying section and the checking section.

24. A zero-knowledge proving method in a system comprising a first mechanism for proofing equality or inequality of two discrete logarithms and a second mechanism for verifying said equality or inequality, the method comprising the steps of:
at the first mechanism,
a) storing a designated operation scheme, two input numbers (hereinafter, denoted by α and β), and two predetermined bases (hereinafter, denoted by g and h) in a first public information memory;

b) storing private information (hereafter, denoted by x) which is a discrete logarithm of α to the base g in a private information memory;
c) generating a first random number (hereafter, denoted by r);
d) converting the input number α, the input number β and the base h to produce α', β' and γ' using the first random number r and the private information x as follows:

$$\alpha' = \alpha^r;$$

$$\beta' = \beta^r; \text{ and}$$

$$\gamma' = h^{xr},$$

wherein said α', β' and γ' are sent to the second mechanism; and
e) proving equality of a discrete logarithm of α' to base α and a discrete logarithm of β' to base β and equality of a discrete logarithm of α' to the base g and a discrete logarithm of γ' to the base h, and
at the second mechanism,
f) storing the designated operation scheme, the two input numbers α and β, and the two predetermined bases g and h in a second public information memory;
g) verifying equality of a discrete logarithm of the received α' to base α and a discrete logarithm of the received β' to base β, and equality of a discrete logarithm of the received α' to the base g and a discrete logarithm of the received γ' to the base h;
h) checking the received β' and γ' to determine equality or inequality thereof; and
i) deciding whether proof of the first mechanism is acceptable, depending on results of the verifying section and the checking section.

25. The method according to claim 24, wherein
the step e) comprises the steps of:
e.1) proving the equality of the discrete logarithm of α' to base α and the discrete logarithm of β' to base β; and
e.2) proving the equality of the discrete logarithm of α' to the base g and the discrete logarithm of γ' to the base h, and
the step g) comprises the steps of:
g.1) verifying the equality of the discrete logarithm of the received α' to base α and the discrete logarithm of the received β' to base β; and
g.2) verifying the equality of the discrete logarithm of the received α' to the base g and the discrete logarithm of the received γ' to the base h.

26. The method according to claim 25, wherein the step h) comprises a step of verifying the equality of the received β' and γ'.

27. The method according to claim 25, wherein the step h) comprises a step of verifying the inequality of the received β' and γ'.

28. The method according to claim 25, wherein the step h) comprises a step of comparing the received β' and γ'.

29. The method according to claim 25, wherein
the step e.1) comprises the steps of:
generating a second random number;
converting the input number α, the input number β to produce first commitments corresponding to respective ones of said α and β using the second random number; and
generating a first response using the first random number r and the second random number, in response to a first challenge received from the second mechanism, and
the step g.1) comprises the steps of:
randomly generating the first challenge after having received the first commitments; and
deciding whether the first response is consistent with the first commitments and the first challenge, wherein a result of the decision is provided to the step i).

30. The method according to claim 25, wherein
the step e.1) comprises the steps of:
generating a second random number and a third random number when having received a first challenge preparation from the second mechanism;
converting the input number α and the input number β to produce first commitments corresponding to respective ones of said α and β using the second random number, wherein the third random number and the first commitments are sent to the second mechanism; and
generating a first response using the first random number r, the second random number, and the third random number in response to a first challenge received from the second mechanism, when the first challenge preparation is valid, and
the step g.1) comprises the steps of:
generating a fourth random number;
generating the first challenge preparation from the base g and the input number α using the fourth random number;
generating the first challenge using the fourth random number after having received the third random number and the first commitments from the first mechanism; and
deciding whether the first response is consistent with the first commitments and the first challenge, wherein a result of the decision is provided to the step i).

31. The method according to claim 25, wherein
the step e.1) comprises the steps of:
generating a second random number;
converting the input number α, the input number β to produce first commitments corresponding to respective ones of said α and β using the second random number;
generating a first automatic challenge from the first commitments;
generating a first response using the first random number r and the second random number, in response to the first automatic challenge; and
generating a first proven text composed of the first commitments and the first response, wherein the first proven text is sent to the second mechanism, and
the step g.1) comprises the steps of:
generating a second automatic challenge after having received the first commitments from the first mechanism; and
deciding whether the first response is consistent with the first commitments and the second automatic challenge, wherein a result of the decision is provided to the step i).

32. The method according to claim 25, wherein
the step e.1) comprises the steps of:
generating a second random number;
converting the input number α, the input number β to produce first commitments corresponding to respective ones of said α and β using the second random number;
generating a first automatic challenge from the first commitments;
generating a first response using the first random number r and the second random number, in response to the first automatic challenge; and generating a first proven text composed of the first automatic challenge and the first response, wherein the first proven text is sent to the second mechanism, and the step g.1) comprises the steps of:

deciding whether the first automatic challenge and the first response included in the first proven text is consistent with each other, wherein a result of the decision is provided to the step i).

33. The method according to claim 25, wherein the step e.2) comprises the steps of:

generating a third random number;

converting the bases g and h to produce second commitments corresponding to respective ones of said g and h using the third random number; and generating a second response using the first random number r and the third random number, in response to a second challenge received from the second mechanism, and the step g.2) comprises the steps of:

randomly generating the second challenge after having received the second commitments from the first mechanism; and deciding whether the second response is consistent with the second commitments and the second challenge, wherein a result of the decision is provided to the step i).

34. The method according to claim 25, wherein the step e.2) comprises the steps of:

generating a fifth random number and a sixth random number when having received a second challenge preparation from the second mechanism;

converting the bases g and h to produce second commitments corresponding to respective ones of the bases g and h using the fifth random number, wherein the sixth random number and the second commitments are sent to the second mechanism; and generating a second response using the first random number r, the fifth random number, and the sixth random number in response to a second challenge received from the second mechanism, when the second challenge preparation is valid, and the step g.2) comprises the steps of:

generating a seventh random number;

generating the second challenge preparation from the base g and the input number $\alpha$ using the seventh random number;

generating the second challenge using the seventh random number after having received the sixth random number and the second commitments from the first mechanism; and a third decision section for deciding whether the second response is consistent with the second commitments and the second challenge, wherein a result of the decision is provided to the step i).

35. The method according to claim 25, wherein the step e.2) comprises the steps of:

generating a third random number;

converting the bases g and h to produce second commitments corresponding to respective ones of the bases g and h using the third random number;

generating a third automatic challenge from the second commitments;

generating a second response using the first random number r and the third random numbers in response to the third automatic challenge; and generating a second proven text composed of the second commitments and the second response, wherein the second proven text is sent to the second mechanism, and the step g.2) comprises the steps of:

generating a fourth automatic challenge after having received the second commitments included in the second proven text from the first mechanism; and deciding whether the second response is consistent with the second commitments and the fourth automatic challenge, wherein a result of the decision is provided to the step i).

36. The method according to claim 25, wherein the step e.2) comprises the steps of:

generating a third random number;

converting the bases g and h to produce second commitments corresponding to respective ones of the bases g and h using the third random number;

generating a third automatic challenge from the second commitments;

generating a second response using the first random number r and the third random number, in response to the third automatic challenge; and generating a second proven text composed of the second automatic challenge and the second response, wherein the second proven text is sent to the second mechanism, and the step g.2) comprises the steps of:

deciding whether the second automatic challenge and the second response included in the second proven text is consistent with each other, wherein a result of the decision is provided to the step i).

37. The method according to claim 24, wherein the step e) comprises the step of proving the equality of the discrete logarithm of $\alpha'$ to base $\alpha$ and the discrete logarithm of $\beta'$ to base $\beta$, and the equality of the discrete logarithm of $\alpha'$ to the base g and the discrete logarithm of $\gamma'$ to the base h, and the step g) comprises the step of verifying the equality of a discrete logarithm of the received $\alpha'$ to base $\alpha$ and a discrete logarithm of the received $\beta'$ to base $\beta$, and the equality of a discrete logarithm of the received $\alpha'$ to the base g and a discrete logarithm of the received $\gamma'$ to the base h.

38. The method according to claim 37, wherein the step e) comprises the steps of:

generating a second random number;

converting the input number $\alpha$, the input number $\beta$, the base g and the base h to produce commitments corresponding to respective ones of said $\alpha$, $\beta$, g, and h using the second random number; and generating a response using the first random number r and the second random number, in response to a challenge received from the second mechanism, and the step g) comprises the steps of:

generating the challenge after having received the commitments from the first mechanism; and deciding whether the response is consistent with the commitments and the challenge, wherein a result of the decision is provided to the step i).

39. The method according to claim 37, wherein the step e) comprises the steps of:

generating a second random number and a third random number when having received a challenge preparation from the second mechanism;

converting the input number $\alpha$, the input number $\beta$, the base g and the base h to produce commitments corresponding to respective ones of said α, β, g, and h using the second random number, wherein the third random number and the commitments are sent to the second mechanism; and generating a response using the first random number r, the second random number, and the third random number in response to a challenge received from the second mechanism, when the challenge preparation is valid, and the step g) comprises the steps of:

generating a fourth random number;

generating the challenge preparation from the base g and the input number α using the fourth random number;

generating the challenge using the fourth random number after having received the third random number and the commitments from the first mechanism; and deciding whether the response is consistent with the commitments and the challenge, wherein a result of the decision is provided to the step i).

40. The method according to claim 37, wherein
the step e) comprises the steps of:
generating a second random number;
converting the input number α, the input number β, the base g and the base h to produce commitments corresponding to respective ones of said α, β, g, and h using the second random number;
generating a first automatic challenge from the commitments;
generating a response using the first random number r and the second random number, in response to the first automatic challenge; and
generating a proven text composed of the commitments and the response, wherein the proven text is sent to the second mechanism, and
the step g) comprises the steps of:
generating a second automatic challenge after having received the commitments from the first mechanism; and
deciding whether the response is consistent with the commitments and the second automatic challenge, wherein a result of the decision is provided to the step i).

41. The method according to claim 37, wherein
the step e) comprises the steps of:
generating a second random number;
converting the input number α, the input number β, the base g and the base h to produce commitments corresponding to respective ones of said α, β, g, and h using the second random number;
generating an automatic challenge from the commitments;
generating a response using the first random number r and the second random number, in response to the automatic challenge; and
generating a proven text composed of the automatic challenge and the response, wherein the proven text is sent to the second mechanism, and
the step g) comprises the steps of:
deciding whether the response and the automatic challenge included in the proven text received from the first mechanism is consistent with each other, wherein a result of the decision is provided to the step i).

42. The method according to claim 37, wherein the step h) comprises a step of verifying the equality of the received β' and γ'.

43. The method according to claim 37, wherein the step h) comprises a step of verifying the inequality of the received β' and γ'.

44. The method according to claim 37, wherein the step h) comprises a step of comparing the received β' and γ'.

45. A computer program instructing a computer to implement a first mechanism for proving equality or inequality of two discrete logarithms and a second mechanism for verifying said equality or inequality, the program comprising the steps of:

to implement the first mechanism, a) storing a designated operation scheme, two input numbers (hereinafter, denoted by α and β), and two predetermined bases (hereinafter, denoted by g and h) in a first public information memory;

b) storing private information (hereafter, denoted by x) which is a discrete logarithm of α to the base g in a private information memory;

c) generating a first random number (hereafter, denoted by r);

d) converting the input number α, the input number β and the base h to produce α', β' and γ' using the first random number r and the private information x as follows:

$$\alpha' = \alpha^r;$$

$$\beta' = \beta^r; \text{ and}$$

$$\gamma' = h^{xr},$$

wherein said α', β' and γ' are sent to the second mechanism; and e) proving equality of a discrete logarithm of α' to base α and a discrete logarithm of β' to base β and equality of a discrete logarithm of α' to the base g and a discrete logarithm of γ' to the base h, and to implement the second mechanism, f) storing the designated operation scheme, the two input numbers α and β, and the two predetermined bases g and h in a second public information memory;

g) verifying equality of a discrete logarithm of the received α' to base α and a discrete logarithm of the received β' to base β, and equality of a discrete logarithm of the received α' to the base g and a discrete logarithm of the received γ' to the base h;

h) checking the received β' and γ' to determine equality or inequality thereof; and i) deciding whether proof of the first mechanism is acceptable, depending on results of the verifying section and the checking section.

46. The computer program according to claim 45, wherein the step e) comprises the steps of:

e.1) proving the equality of the discrete logarithm of α' to base α and the discrete logarithm or β' to base β; and e.2) proving the equality of the discrete logarithm of α' to the base g and the discrete logarithm of γ' to the base h, and the step g) comprises the steps of:

g.1) verifying the equality of the discrete logarithm of the received α' to base α and the discrete logarithm of the received β' to base β; and g.2) verifying the equality of the discrete logarithm of the received α' to the base g and the discrete logarithm of the received γ' to the base h.

47. The computer program according to claim 46, wherein the step h) comprises a step of verifying the equality of the received β' and γ'.

48. The computer program according to claim 46, wherein the step h) comprises a step of verifying the inequality of the received $\beta'$ and $\gamma'$.

49. The computer program according to claim 46, wherein the step h) comprises a step of comparing the received $\beta'$ and $\gamma'$.

50. The computer program according to claim 45, wherein
the step e) comprises the step or proving the equality of the discrete logarithm of $\alpha'$ to base $\alpha$ and the discrete logarithm of $\beta'$ to base $\beta$, and the equality of the discrete logarithm of $\alpha'$ to the base g and the discrete logarithm of $\gamma'$ to the base h, and the step g) comprises the step of verifying the equality of a discrete logarithm of the received $\alpha'$ to base $\alpha$ and a discrete logarithm of the received $\beta$ to base $\beta$, and the equality of a discrete logarithm of the received $\alpha'$ to the base g and a discrete logarithm of the received $\gamma'$ to the base h.

51. The computer program according to claim 50, wherein the step h) comprises a step of verifying the equality of the received $\beta'$ and $\gamma'$.

52. The computer program according to claim 50, wherein the step h) comprises a step of verifying the inequality of the received $\beta'$ and $\gamma'$.

53. The computer program according to claim 50, wherein the step h) comprises a step of comparing the received $\beta'$ and $\gamma'$.

* * * * *